(12) United States Patent
Takahashi et al.

(10) Patent No.: US 7,256,099 B2
(45) Date of Patent: Aug. 14, 2007

(54) METHOD OF PRODUCING ELECTROCHEMICAL DEVICE, AND THE ELECTROCHEMICAL DEVICE

(75) Inventors: Tetsuya Takahashi, Tokyo (JP); Kazuo Katai, Tokyo (JP); Yousuke Miyaki, Tokyo (JP)

(73) Assignee: TDK Corporation, Tokyo (JP)

(*) Notice: Subject to any disclaimer, the term of this patent is extended or adjusted under 35 U.S.C. 154(b) by 456 days.

(21) Appl. No.: 10/990,467

(22) Filed: Nov. 18, 2004

(65) Prior Publication Data

US 2005/0122664 A1 Jun. 9, 2005

(30) Foreign Application Priority Data

Nov. 20, 2003 (JP) .......................... P2003-391180

(51) Int. Cl.
*H01L 21/76* (2006.01)
*H01L 21/20* (2006.01)
*H01L 21/00* (2006.01)
*H01M 4/82* (2006.01)

(52) U.S. Cl. ..................... 438/400; 438/381; 29/25.03; 29/623.5; 361/502; 361/503

(58) Field of Classification Search ............... 438/400; 361/502, 503, 504, 523, 528; 29/25.01, 25.03, 29/623.5

See application file for complete search history.

(56) References Cited

U.S. PATENT DOCUMENTS 6,426,865 B2 * 7/2002 Kasahara et al. ........... 361/512

FOREIGN PATENT DOCUMENTS

| JP | 2000-252175 | 9/2000 |
| JP | 2001-250742 | 9/2001 |
| JP | A 2003-157898 | 5/2003 |

* cited by examiner

*Primary Examiner*—Long K. Tran
(74) *Attorney, Agent, or Firm*—Oliff & Berridge, PLC

(57) ABSTRACT

A first electrode and a second electrode to be used are electrodes each of which has a collector, and a porous material layer with electron conductivity placed between the collector and a separator, and each of which has a configuration wherein the porous material layer includes at least particles of a porous material with electron conductivity, and a thermoplastic resin being capable of binding the particles of the porous material together and having a softening point $T_B$ lower than a softening point $T_S$ of the separator. A production method includes a thermal treatment step of thermally treating a laminate at a thermal treatment temperature T1 satisfying a condition represented by Formula (1): $T_B \leq T1 < T_S$, thereby bringing the collector of the first electrode, the porous material layer of the first electrode, the separator, the porous material layer of the second electrode, and the collector of the second electrode in the laminate into an integrated state.

11 Claims, 18 Drawing Sheets

METHOD OF PRODUCING ELECTROCHEMICAL DEVICE, AND THE ELECTROCHEMICAL DEVICE

BACKGROUND OF THE INVENTION

1. Field of the Invention

The present invention relates to a method of producing an electrochemical device, and the electrochemical device produced by this method. More particularly, the present invention relates to a method of producing an electrochemical device, which embraces an electrochemical capacitor such as an electric double layer capacitor and a secondary battery such as a lithium ion secondary battery, and to the electrochemical device produced by this method.

2. Related Background Art

The electrochemical capacitors including the electric double layer capacitors, and non-aqueous electrolyte secondary batteries including the lithium ion secondary batteries are electrochemical devices whose size and weight can be readily reduced. For this reason, they are expected as power supplies or backup power supplies for portable equipment (compact electronic instruments) or the like, or as auxiliary power supplies for battery cars or for hybrid cars, and various studies have been conducted for improvement in performance thereof.

An example of such electrochemical devices improved in performance, having been proposed heretofore, is an electric double layer capacitor consisting of a laminate of polarizable electrodes, a separator, and collectors, which is made by placing a thermally fluidizable material (polyethylene, polypropylene, or the like) between each set of collector and polarizable electrode, heating them under pressure, and thereafter cooling them to effect bonding (Japanese Patent. Application Laid-Open No. 2000-252175). Another proposed configuration for this electric double layer capacitor is such that the thermally fluidizable material is placed between the separator and the polarizable electrodes. This electric double layer capacitor is designed in the foregoing configurations to enhance electrically conductive connection between the collectors and the polarizable electrodes and to facilitate assembly of a cell.

Another example of the electrochemical devices improved in performance, having been proposed heretofore, is an electric double layer capacitor having an adhesion structure in which a separator is interposed between a pair of polarizable electrodes and in which the polarizable electrodes and separator are adhered to each other, and a production method thereof.

In the electric double layer capacitor and the production method thereof, the separator is made of nonwoven fabric or porous film containing 10 or more wt % polyolefin-based resin, and the polarizable electrodes and separator are bonded to each other by applying pressure to the pair of polarizable electrodes under a temperature environment not less than a softening point of the polyolefin-based resin (e.g., reference is made to Claims 1 to 3 in Japanese Patent Application Laid-Open No. 2001-250742).

This electric double layer capacitor is constructed in the above configuration whereby the polarizable electrodes and separator are bonded to be integrated with each other, so as to suppress change of internal resistance due to change of pressing force from two sides of the cell, to suppress peeling-off between the polarizable electrodes and the separator, and to realize excellent long-term reliability.

SUMMARY OF THE INVENTION

However, the electrochemical devices and the production methods thereof described in aforementioned Japanese Patent Applications Laid-Open No. 2000-252175 and Laid-Open No. 2001-250742 still had the problems that the electric resistance in the electrochemical device was not adequately reduced and that satisfactory charge/discharge characteristics were not achieved yet.

Specifically, the electric double layer capacitor described in Japanese Patent Application Laid-Open No. 2000-252175 had the problem that the electrical contact resistance between the collector and the polarizable electrode was not adequately reduced, because the thermally fluidizable material was placed between the collector and the polarizable electrode. Furthermore, in the case of the configuration wherein the thermally fluidizable material is placed between the separator and the polarizable electrodes, there was the problem that the thermally fluidizable material, after heated to flow, flowed into pores in the separator (particularly, pores in the vicinity of the surface of the separator) to close the pores. The closure of the pores in the separator will result in impeding movement of ions (ion conduction) in the electrolyte (electrolyte solution or the like) impregnated in the separator, and, in turn, failing to achieve satisfactory charge/discharge characteristics.

In the electric double layer capacitor and the production method thereof described in Japanese Patent Application Laid-Open No. 2001-250742, the heating and pressing process for integrating the pair of polarizable electrodes and the separator interposed between the pair of polarizable electrodes is carried out under the temperature environment not less than the softening point of the polyolefin-based resin as a constituent material of the separator. For this reason, there was the problem that, while the polarizable electrodes and separator could be integrated, the pores in the separator were closed during softening of the separator to fail to adequately reduce the ionic conduction resistance in the electrolyte (electrolyte solution or the like), so as to fail to achieve satisfactory charge/discharge characteristics.

Furthermore, in order to solve the foregoing problem, there is another method of carrying out no thermal treatment for the laminate of the pair of polarizable electrodes and the separator. In this case, however, there will arise problems that handleability of the laminate considerably degrades during production and during use and that because of the non-integrated structure of the laminate, the polarizable electrodes and the separator move relative to each other in the laminate during use to considerably degrade the charge/discharge characteristics. Therefore, this method is not practical. Particularly, this problem is likely to arise prominently in configurations wherein a plurality of laminates are stacked and connected in series or in parallel.

The electrochemical capacitors of the other kinds (pseudo capacitance capacitors, redox capacitors, etc.) than the foregoing electric double layer capacitors also had much the same problems as described above, as long as they had the structure similar to the conventional electric double layer capacitors described above.

Furthermore, the same problems as above also arose in the primary batteries or secondary batteries having an anode, at which oxidation reaction proceeds during discharge, and a cathode, at which reduction reaction proceeds during discharge, instead of the pair of polarizable electrodes of the electric double layer capacitor, and a separator placed between the anode and the cathode, as long as they had the structure similar to the conventional electric double layer capacitors described above.

The present invention has been accomplished in view of the problems of the conventional technologies, and an object of the present invention is to provide a production method of an electrochemical device capable of readily and surely forming the electrochemical device capable of achieving satisfactory charge/discharge characteristics even in the case where the electrodes and separator are integrated in close contact by a thermal treatment. Another object of the present invention is to provide the electrochemical device obtained by the foregoing production method of the electrochemical device according to the present invention.

Inventors conducted intensive and extensive research in order to achieve the above objects and found it extremely effective in achieving the above objects to determine a combination of constituent materials of a thermoplastic resin as a binder included in porous material layers of electrodes, and a separator, in consideration of each other's softening points and to determine a thermal treatment temperature in a thermal treatment step in consideration of the softening point of the thermoplastic resin and the softening point of the separator, thus accomplishing the present invention.

Namely, the present invention provides a method of producing an electrochemical device which comprises a laminate having a first electrode and a second electrode facing each other, and a porous separator adjacently placed between the first electrode and the second electrode, and in which the first electrode and the second electrode are electrodes each having a collector, and a porous material layer with electron conductivity placed between the collector and the separator, the method comprising making the porous material layer, using as constituent materials thereof, at least particles of a porous material with electron conductivity, and a thermoplastic resin which can bind the particles of the porous material together and which has a softening point $T_S$ lower than a softening point $T_S$ of the separator, and the method comprising a thermal treatment step of thermally treating the laminate at a thermal treatment temperature T1 satisfying a condition expressed by Formula (1) below, thereby bringing the collector of the first electrode, the porous material layer of the first electrode, the separator, the porous material layer of the second electrode, and the collector of the second electrode in the laminate into an integrated state.

$$T_B \leqq T1 < T_S \tag{1}$$

In the present invention the units of T1, $T_B$, and $T_S$ all are "° C."

In the present invention, the "softening point $T_S$ of the separator" is defined as follows: where the separator is formed of one constituent material (e.g., a synthetic resin), the softening point $T_S$ indicates the softening point of the constituent material; where the separator is made of two or more constituent materials, the softening point $T_S$ indicates the lowest.

Furthermore, in the present invention, the "softening point $T_B$ of the thermoplastic resin" is defined as follows: where the thermoplastic resin is formed of one constituent material (e.g., a synthetic resin), the softening point $T_B$ indicates the softening point of the constituent material; where the thermoplastic resin is made of two or more constituent materials, the softening point $T_B$ indicates the lowest.

In the present specification, as to the laminate having the first electrode and the second electrode facing each other, and the porous separator adjacently placed between the first electrode and the second electrode, the laminate obtained through the aforementioned thermal treatment in the thermal treatment step according to the present invention will be referred to hereinafter as an "electrochemical device base" (the laminate of the collector of the first electrode, the porous material layer of the first electrode, the separator, the porous material layer of the second electrode, and the collector of the second electrode in the integrated state), which is thereby distinguished from the laminate before subjected to the thermal treatment step.

The "porous material layer of the first electrode" and/or the "porous material layer of the second electrode" included in the "laminate before subjected to the thermal treatment step" may be defined as follows: where these are formed through the steps of preparing a coating solution for formation of the porous material layer containing the constituent materials of the porous material layer, applying the coating solution onto the collector (the collector of the first electrode or the collector of the second electrode) or onto the separator, and further drying a liquid film of the coating solution deposited on the collector (the collector of the first electrode or the collector of the second electrode) or on the separator, the porous material layers may be layers obtained after the drying of the liquid film. Furthermore, the "porous material layer of the first electrode" and/or the "porous material layer of the second electrode" included in the "laminate before subjected to the thermal treatment step" may be layers after preliminarily subjected to a predetermined thermal treatment.

In the case of the foregoing configuration of the electrochemical device base, it may have a configuration wherein an electrolyte solution is contained inside the first electrode, the second electrode, and the separator, a configuration wherein a gel electrolyte is contained inside the first electrode, the second electrode, and the separator, or a configuration wherein a solid electrolyte (a solid polymer electrolyte or an electrolyte consisting of an ion-conductive inorganic material) is contained inside the first electrode, the second electrode, and the separator.

The "electrochemical device base" may have the three-layered structure consisting of the first electrode, the separator, and the second electrode, as in the above, configuration, or may also have a configuration of five or more layers consisting of an alternate stack of the foregoing electrodes and separator (or solid electrolyte film) (a configuration of five or more layers consisting of an alternate stack of layers of electrodes and layers of separators). In the case of the latter configuration, the electrodes except for those placed at both ends of the electrochemical device base, i.e., the electrodes placed inside the electrochemical device base may be constructed in a configuration wherein porous material layers are formed on both surfaces on one collector.

Furthermore, in the present invention, the "electrochemical device" refers to a device in a configuration having at least the aforementioned electrochemical device base, an electrolyte (the electrolyte solution, the gel electrolyte, or the aforementioned solid electrolyte) impregnated in the electrochemical device base, and a case housing the electrochemical device base and the electrolyte in a hermetically sealed state.

More specifically, the "electrochemical device" preferably indicates an electrochemical capacitor or a secondary battery. Examples of the electrochemical capacitor include an electric double layer capacitor, a pseudo capacitance capacitor, a redox capacitor, and so on. Preferred examples of the secondary battery include a non-aqueous electrolyte secondary battery using a non-aqueous electrolyte, such as a lithium ion secondary battery, a secondary battery using an aqueous electrolyte solution, and so on. Furthermore, from the viewpoint of using it as a device capable of smoothly implementing charge/discharge of large electric current over long periods, the "electrochemical device" is more preferably the aforementioned electrochemical capacitor and from the same viewpoint, it is much more preferably the electric double layer capacitor.

In the present invention, the case may be a metal case, or a synthetic resin case, or a case made of a composite packaging film consisting of a stack of at least one layer containing a primary component of synthetic resin and at least one metal layer. The case to be used can be properly selected from these cases in view of the mechanical strength, corrosion resistance, weight, etc. necessary for the case in accordance with an operating environment of the electrochemical device.

In the production method of the electrochemical device of the present invention, as described above, the thermoplastic resin being capable of binding the particles of the porous material with electron conductivity together and having the softening point $T_B$ lower than the softening point $T_S$ of the separator is used in the porous material layer of the first electrode and in the porous material layer of the second electrode, and the thermal treatment is carried out at the thermal treatment temperature T1 satisfying the aforementioned Formula (1) in the thermal treatment step of the electrochemical device base (laminate).

Since this prevents the separator from softening in the thermal treatment step, the closure of the pores inside the separator is well prevented. For this reason, sufficient ion conductivity can be secured in the electrolyte impregnated in the separator.

The thermoplastic resin existing in the vicinity of the surfaces of the porous material layers softens in the thermal treatment step, so that the surfaces of the porous material layers (the surfaces on the side in contact with the separator) are deformed so as to fit the shape of uneven part in the surfaces of the separator. For this reason, the porous material layers and the separator can be adequately closely fit.

Furthermore, the thermoplastic resin existing in the vicinity of the surfaces of the porous material layers softens in the thermal treatment step, so that the surfaces of the porous material layers (the surfaces on the side in contact with the collector) are deformed so as to fit the shape of uneven part in the surface of the collector. For this reason, the porous material layers and the collectors can be closely fit while adequately retaining electric contact.

In the production method of the electrochemical device of the present invention, therefore, even in the case where the electrodes and the separator are integrated in a close contact state by the thermal treatment, the electrochemical device capable of achieving satisfactory charge/discharge characteristics can be readily and securely formed.

The close contact state between the electrodes and the separator of the electrochemical device base obtained through the thermal treatment step in the production method of the present invention (a state in which the surfaces of the porous material layers are in close contact as deformed so as to fit the shape of uneven part in the surfaces of the separator by the thermal treatment (or, a thermal treatment and a pressing process carried out simultaneously with the thermal treatment)) can be confirmed by SEM photography of cross sections of the base.

If the thermal treatment temperature T1 is set at or above the softening point $T_S$ of the separator, the separator will soften in the thermal treatment step and it will result in failing to fully prevent the closure of the pores inside the separator and thus failing to secure sufficient ion conductivity.

If the thermal treatment temperature T1 is set below the softening point $T_B$ of the thermoplastic resin in the porous material layers, the thermoplastic resin will not soften in the thermal treatment step and it will result in failing to achieve sufficient close contact between the separator and the porous material layers. In this case, for the same reason as above, it will also fail to achieve sufficient close contact between the collectors and the porous material layers.

Furthermore, in the present invention the thermal treatment temperature T1 is not less than the softening point $T_B$ of the thermoplastic resin in the porous material layers. If the thermal treatment temperature T1 is over the softening point $T_B$ of the thermoplastic resin and is not less than the melt temperature of the thermoplastic resin, the thermoplastic resin in a molten state will penetrate the porous material inside the electrode layers to cover the pores inside the electrodes. In this case, the capacity of the electrodes will be lowered, so that the electrochemical device cannot meet required characteristics. For this reason, the "thermal treatment temperature T1" in the present invention indicates the temperature satisfying the condition expressed by Formula (1) and temperature less than the melt temperature of the thermoplastic resin in the porous material layers.

Furthermore, in the present invention there are no particular restrictions on a specific technique of integrating the first electrode, the separator, and the second electrode in the thermal treatment step as long as the thermal treatment is carried out at the thermal treatment temperature T1 satisfying the condition of aforementioned Formula (1). It may be done by use of the well-known production techniques of the electrochemical device, but, particularly in the present invention, it is preferable to adopt one selected from methods of (I) to (V) described below. Furthermore, among the below methods of (I) to (V), the method (I) or the method (II) is more preferably applicable in terms of production efficiency, easiness of formation of thin porous material layers, and so on.

(I) (i) The first step is to prepare a coating solution for formation of the porous material layers containing the constituent materials of the porous material layers. (ii) The next step is to apply the coating solution onto a collector. (iii) The next step is to dry a liquid film of the coating solution deposited on the collector to remove a solvent from the interior of the liquid film, so as to obtain a laminate in which a porous material layer in a state before the thermal treatment (which will be referred to hereinafter as a "precursor layer" as occasion demands) is formed on the collector (hereinafter referred to as a "laminate 1"). (iv) A sheetlike separator prepared separately is placed between a pair of laminates 1 to obtain a laminate (hereinafter referred to as a "laminate 2"). (v) The laminate 2 is interposed between a pair of heating members and the thermal treatment step is carried out by heating at least one of the pair of heating members at the thermal treatment temperature T1 satisfying the condition of Formula (1), to obtain the electrochemical device base in which the collector, the porous material layer, the separator, the porous material layer, and the collector all are integrated in close contact in the order named.

In the case of this method of (I), the laminate 2 may be pushed (or pressed) by the pair of heating members during the thermal treatment in the thermal treatment step of (v), if necessary. In the step of (iii), if necessary, the laminate 1 may be subjected to a process of interposing it between a pair of heating members and heating at least one of the pair of heating members (under pressure if necessary) to obtain an electrode (the first electrode and/or the second electrode) in which the collector and the porous material layer are integrated. Furthermore, the electrochemical device base may have the configuration of five or more layers as described previously, instead of the three-layered structure.

(II) (i) The first step is to prepare a kneaded product (without the solvent included in the coating solution described above) for formation of the porous material layers containing the constituent materials of the porous material layers. (ii) The next step is to apply or disperse the kneaded product onto a collector. (iii) The next step is to thermally press a layer of the kneaded product deposited or dispersed on the collector, to obtain a laminate in which a porous material layer (precursor layer) in a state before the thermal treatment (before the thermal treatment according to the present invention) is formed on the collector (hereinafter referred to as a "laminate 3"). (iv) A sheetlike separator prepared separately is placed between a pair of laminates 3 to obtain a laminate (hereinafter referred to as a "laminate 4"). (v) The laminate 4 is interposed between a pair of heating members and the thermal treatment step is carried out by heating at least one of the pair of heating members at the thermal treatment temperature T1 satisfying the condition of Formula (1), to obtain the electrochemical device base in which the collector, the porous material layer, the separator, the porous material layer, and collector all are integrated in close contact in the order named.

In the case of this method of (II), if necessary, the laminate 4 may be pushed (or pressed) by the pair of heating members during the thermal treatment in the thermal treatment step of (v). In the step of (iii), if necessary, the laminate 1 may be subjected to a process of interposing it between a pair of heating members and heating at least one of the pair of heating members (under pressure if necessary) to obtain an electrode (the first electrode and/or the second electrode) in which the collector and the porous material layer are integrated. Furthermore, the electrochemical device base may have the configuration of five or more layers as described previously, instead of the three-layered structure.

(III) (i) The first step is to prepare a coating solution containing the constituent materials of the porous material layers. (ii) The next step is to apply the coating solution onto both surfaces of a sheetlike separator. At this time, the composition of the coating solution is controlled so as to prevent the coating solution from penetrating into pores in the separator. For example, the composition of the coating solution is controlled by adjusting the viscosity of the coating solution, the contact angle of the coating solution to the separator, or the like. (iii) The next step is to dry liquid films of the coating solution deposited onto the both surfaces of the separator, to remove a solvent from the interior of the liquid films, thereby obtaining a laminate in which porous material layers in a state before the thermal treatment (precursor layers) are formed on the both surfaces of the separator (hereinafter referred to as a "laminate 5"). (iv) The laminate 5 is placed between a pair of collectors to obtain a laminate (hereinafter referred to as a "laminate 6"). (v) The laminate 6 is interposed between a pair of heating members and the thermal treatment step is carried out by heating at least one of the pair of heating members at the thermal treatment temperature T1 satisfying the condition of Formula (1), to obtain the electrochemical device base in which the collector, the porous material layer, the separator, the porous material layer, and the collector all are integrated in close contact in the order named.

In the case of this method of (III), if necessary, the laminate 6 may be pushed (or pressed) by the pair of heating members during the thermal treatment in the thermal treatment step of (v). In the step of (iii), if necessary, the laminate 5 may be subjected to a process of interposing it between a pair of heating members and heating at least one of the pair of heating members (under pressure if necessary) to obtain a laminate in which the separator and the porous material layers are integrated. Furthermore, the electrochemical device base may have the configuration of five or more layers as described previously, instead of the three-layered structure.

(IV) (i) The first step is to prepare a kneaded product (without the solvent in the coating solution in (I)) for formation of the porous material layers containing the constituent materials of the porous material layers. (ii) The next step is to apply or disperse the kneaded product onto both surfaces of a sheetlike separator. At this time, for example, the viscosity of the kneaded product or the size of constitutive particles is adjusted so as to prevent the kneaded product from penetrating into the pores in the separator. (iii) The next step is to thermally press layers of the kneaded product deposited or dispersed on the both surfaces of the separator, to obtain a laminate in which porous material layers in a state before the thermal treatment (before the thermal treatment according to the present invention) (precursor layers) are formed on the surfaces (hereinafter referred to as a "laminate 7"). (iv) The laminate 7 is placed between a pair of collectors to obtain a laminate (hereinafter referred to as a "laminate 8"). (v) The laminate 8 is interposed between a pair of heating members and the thermal treatment step is carried out by heating at least one of the pair of heating members at the thermal treatment temperature T1 satisfying the condition of Formula (1), to obtain the electrochemical device base in which the collector, the porous material layer, the separator, the porous material layer, and the collector all are integrated in close contact in the order named.

In the case of this method of (IV), if necessary, the laminate 8 may be pushed (or pressed) by the pair of heating members during the thermal treatment in the thermal treatment step of (v). In the step of (iii), if necessary, the laminate 7 may be subjected to a process of interposing it between a pair of heating members and heating at least one of the pair of heating members (under pressure if necessary) to obtain a laminate in which the separator and the porous material layers are integrated. Furthermore, the electrochemical device base may have the configuration of five or more layers as described previously, instead of the three-layered structure.

(V) (i) The first step is to prepare a coating solution for formation of the porous material layers containing the constituent materials of the porous material layers or a kneaded product for formation of the porous material layers containing the constituent materials of the porous material layers. (ii) Sheetlike porous material layers are formed using the coating solution or the kneaded product. (iii) A sheetlike separator is prepared. (iv) The next step is to stack a collector, the sheetlike porous material layer, the sheetlike separator, the sheetlike porous material layer, and a collector in the order named, to obtain a laminate (hereinafter referred to as a "laminate 9"). (v) The laminate 9 is interposed between a pair of heating members and the thermal treatment step is carried out by heating at least one of the pair of heating members at the thermal treatment temperature T1 satisfying the condition of Formula (1), to obtain the electrochemical device base in which the collector, the porous material layer, the separator, the porous material layer, and the collector all are integrated in close contact in the order named.

In the case of this method of (V), the electrochemical device base may have the configuration of five or more layers as described previously, instead of the three-layered structure.

In the production method of the electrochemical device of the present invention, it is preferable to use electrodes of platelike shape as the first electrode and the second electrode and to use a member of platelike shape as the separator.

This permits the electrochemical device base consisting of the first electrode, the separator, and the second electrode to be formed in thin film shape, which makes it easier and surer to form the electrochemical device itself in thin film shape. For this reason, it is feasible to more readily construct the electrochemical device having a configuration to facilitate reduction of size and weight.

In the production method of the electrochemical device of the present invention, the thermal treatment step may comprise placing the laminate between a pair of heating members facing each other and heating at least one of the pair of heating members. This permits the thermal treatment step to be readily carried out. The thermal treatment step can be readily carried out, particularly, in the case where the electrodes of platelike shape are used as the first electrode and the second electrode and where the member of platelike shape is used as the separator, as described above. In this case, it is preferable to heat the both of the pair of heating members, in terms of more readily and more securely obtaining the electrochemical device base in which the first electrode, the separator, and the second electrode are adequately in close contact.

In the present invention the "heating members" themselves may be heat generators or they may be heat conductors to conduct heat from other heat generators, as long as they can supply heat enough to achieve the close contact between the first electrode, the separator, and the second electrode, to them.

Furthermore, in the case using the heating members, the thermal treatment step is preferably to heat at least one of the pair of heating members in a state in which the laminate is pressed by the pair of heating members. By heating the laminate in the pushed (pressed) state in this manner, it is feasible to further readily and further securely obtain the electrochemical device base in which the first electrode, the separator, and the second electrode are adequately in close contact.

From the viewpoint of more readily constructing the electrochemical device having the configuration to facilitate reduction of size and weight, the production method of the electrochemical device of the present invention is preferably arranged to use a composite packaging film consisting of a laminate of at least one layer containing a primary component of synthetic resin and at least one metal layer. The composite packaging film to be used is preferably a composite packaging film having at least an innermost layer of a synthetic resin in contact with the electrolyte solution, and a metal layer placed above the innermost layer.

Since the innermost layer of synthetic resin is placed in this manner, it assures sufficient flexibility of the composite packaging film. By placing the metal layer, it is feasible to secure sufficient mechanical strength of the composite packaging film and to prevent a component of the electrolyte solution inside the case from dissipating to the outside of the case and to adequately prevent air (water and oxygen) from flowing from the exterior of the case into the interior of the case. Furthermore, by placing the innermost layer of synthetic resin inside the metal layer, it is feasible to fully prevent progress of corrosion of the metal layer due to the component of the electrolyte solution inside the case.

This makes it feasible to more readily and more securely construct the electrochemical device capable of fully preventing occurrence of liquid leakage. Furthermore, from the viewpoint of adequately preventing the occurrence of liquid leakage and the viewpoint of securing sufficient mechanical strength, a further layer of a synthetic resin is more preferably placed outside the metal layer.

In the production method of the electrochemical device of the present invention, where the case to be used is a case formed using a lightweight composite packaging film with flexibility which can be readily formed in thin film shape, it becomes easier to form the electrochemical device itself in thin film shape. In the production method of the present invention, therefore, the electrochemical device having the configuration to facilitate reduction of size and weight can be readily constructed. For this reason, it is feasible to readily improve the original volume energy density and also to readily improve the energy density per unit volume of an installation space in which the electrochemical device is to be installed (which will also be referred to hereinafter as "volume energy density on the basis of the volume of the space for the device to be installed").

The "volume energy density" of the electrochemical device is originally defined by a ratio of overall output energy to overall volume including the container of the electrochemical device. In contrast to it, the "volume energy density on the basis of the volume of the space for the device to be installed" refers to a ratio of overall output energy of the electrochemical device to apparent volume determined based on the maximum length, the maximum width, and the maximum thickness of the electrochemical device. When the electrochemical device is mounted on a compact electronic device in practice, the improvement in the volume energy density on the basis of the volume of the space for the device to be installed, together with the improvement in the original volume energy density described above, is a significant issue in terms of effectively using the limited space in the compact electronic device in a state in which the dead space is fully reduced.

The present invention also provides the electrochemical device obtained by any one of the production methods of the electrochemical device of the present invention described above. Since the electrochemical device of the present invention is produced by the production method of the electrochemical device of the present invention described above, the internal resistance thereof is fully reduced and thus it can achieve satisfactory charge/discharge characteristics.

DESCRIPTION OF THE PREFERRED EMBODIMENTS

A preferred embodiment of the production method of the electrochemical device of the present invention will be described below in detail with reference to the drawings. Identical or equivalent portions will be denoted by the same reference symbols throughout the description hereinafter, without redundant description.

Figure 1:
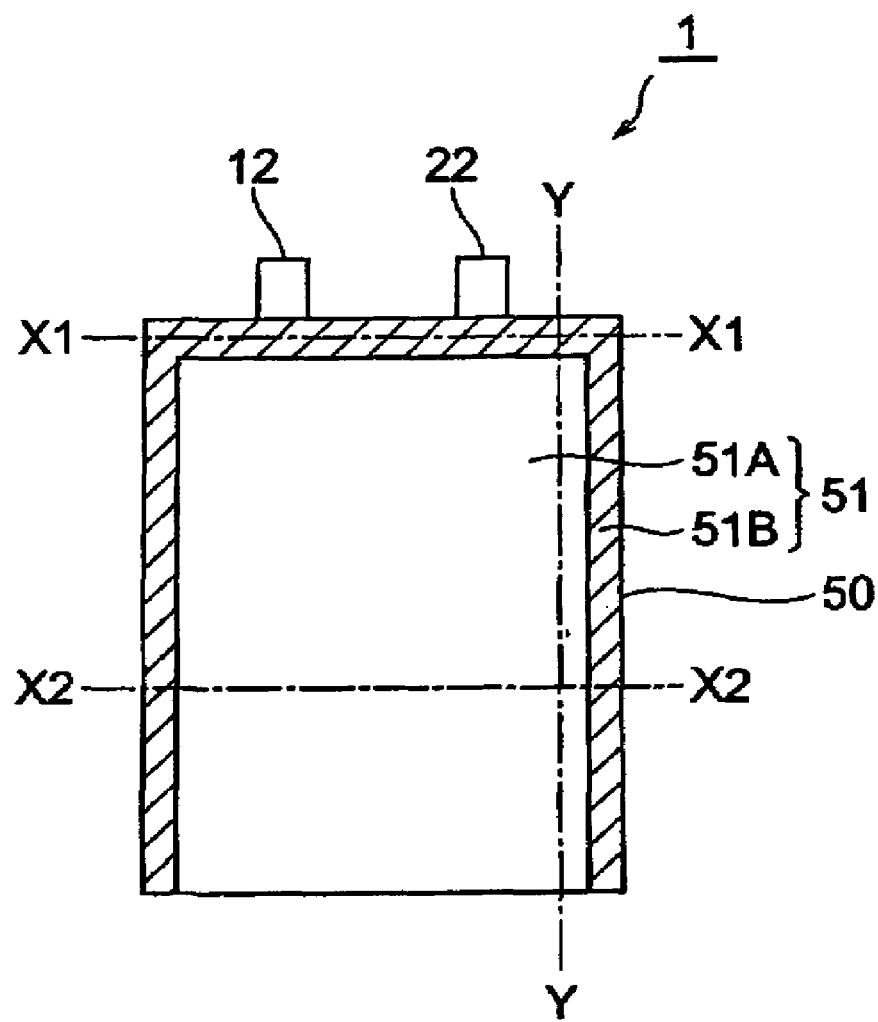
FIG. 1 is a front view showing an example of the electrochemical device (an electric double layer capacitor) produced by a preferred embodiment of the production method of the present invention.

FIG. 1 is a front view showing a preferred embodiment of the electrochemical device of the present invention (an electric double layer capacitor). This electrochemical device 1 of FIG. 1 is produced by a preferred embodiment of the production method of the electrochemical device of the present invention.

Figure 2:
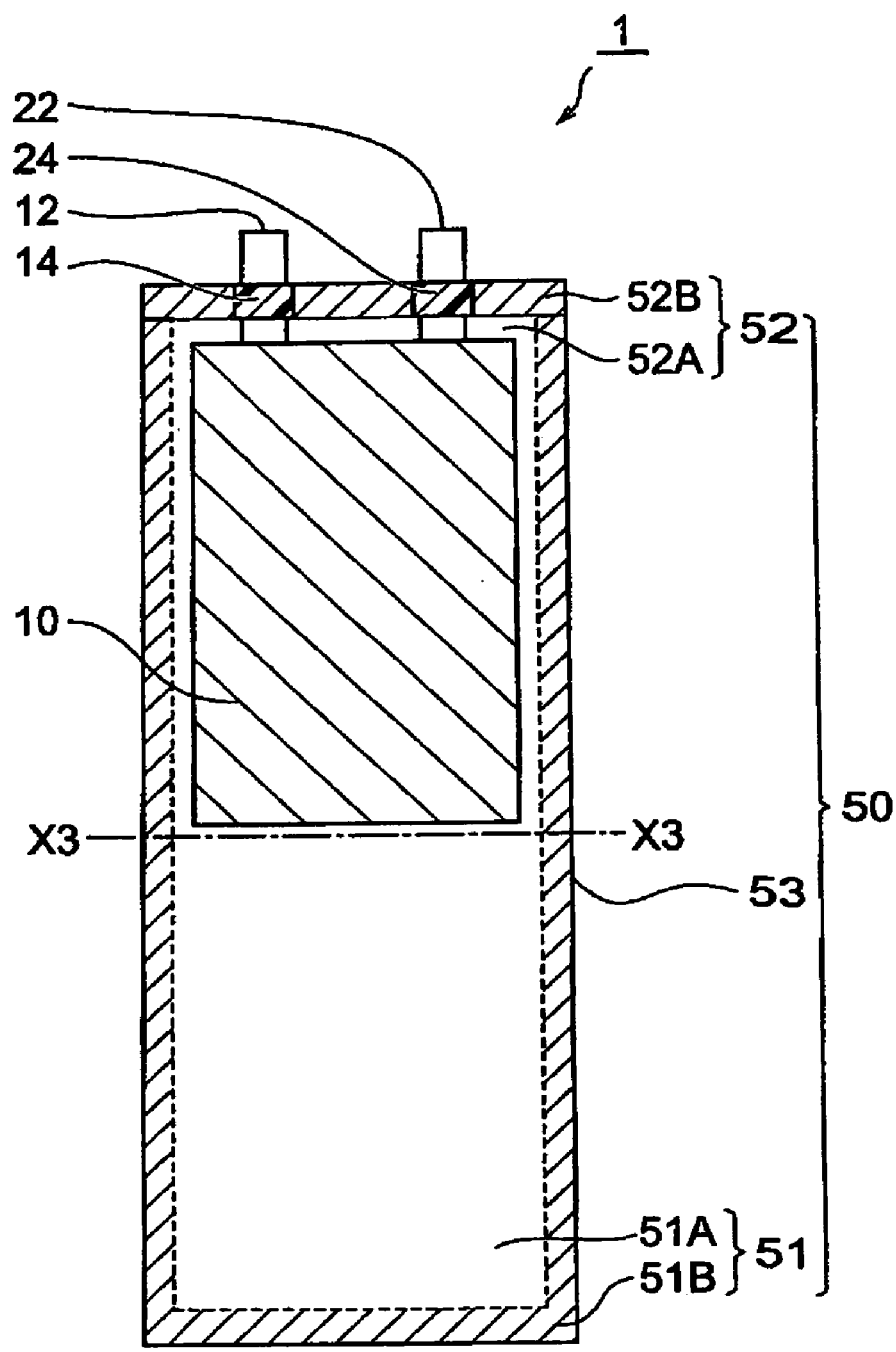
FIG. 2 is a development elevation where the interior of the electrochemical device (electric double layer capacitor) shown in FIG. 1 is viewed from the normal direction to a surface of anode 10.
Figure 3:
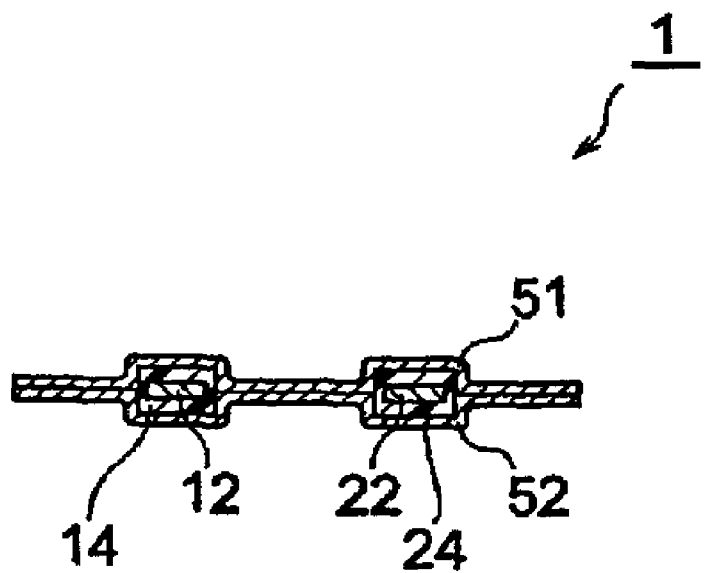
FIG. 3 is a schematic sectional view where the electrochemical device (electric double layer capacitor) shown in FIG. 1 is cut along X1-X1 line of FIG. 1.

FIG. 2 is a development elevation where the interior of the electrochemical device 1 shown in FIG. 1 is viewed from the normal direction to a surface of anode 10. Furthermore, FIG. 3 is a schematic sectional view where the electrochemical device shown in FIG. 1 is cut along X1-X1 line of FIG. 1.

Figure 4:
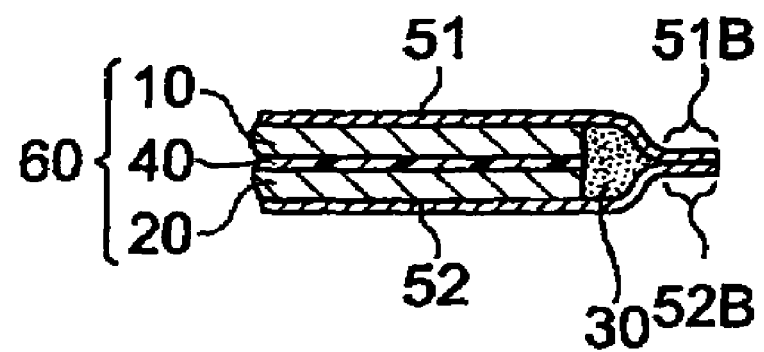
FIG. 4 is a schematic sectional view showing major part where the electrochemical device (electric double layer capacitor) shown in FIG. 1 is cut along X2-X2 line of FIG. 1.
Figure 5:
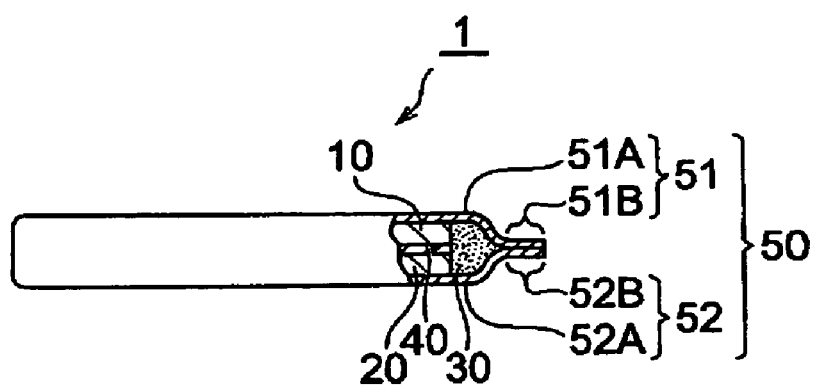
FIG. 5 is a schematic sectional view showing major part where the electrochemical device (electric double layer capacitor) shown in FIG. 1 is cut along Y-Y line of FIG. 1.

FIG. 4 is a schematic sectional view showing the major part where the electrochemical device shown in FIG. 1 is cut along X2-X2 line, of FIG. 1.

As shown in FIGS. 1 to 5, the electric double layer capacitor 1 consists chiefly of an anode 10 (first electrode) of flat plate shape and a cathode 20 (second electrode) of flat plate shape facing each other, a separator 40 of flat plate shape adjacently placed between anode 10 and cathode 20, an electrolyte solution 30 impregnated in anode 10, cathode 20, and separator 40, a case 50 housing these components in a hermetically sealed state, an anode lead 12 (first lead) one end of which is electrically connected to the anode 10 and the other end of which projects to the outside of the case 50, and a cathode lead 22 (second lead) one end of which is electrically connected to the cathode 20 and the other end of which projects to the outside of the case 50.

Here the "anode" 10 and "cathode" 20 are determined on the basis of polarities during discharge of the electrochemical device 1, for convenience sake of description.

The electrochemical device 1 has a configuration as described below. Each of the components of the present embodiment will be described below in detail on the basis of FIGS. 1 to 9.

The case 50 has a first film 51 and a second film 52 facing each other, as described previously. In this electrochemical device 1, as shown in FIG. 2, the first film 51 and the second film 52 are interconnected. Namely, the case 50 is formed by folding a rectangular film of a single composite packaging film on a fold line X3-X3 shown in FIG. 2, so as to lay a set of opposed edges of the rectangular film (edge 51B of the first film 51 and edge 52B of the second film 52 in the drawing) one over the other, and heat-sealing (thermally bonding) the edges in a thermal bonding step described later.

Thus, the first film 51 and the second film 52 represent respective portions of the film having faces (F51 and F52) facing each other, which are made when the single rectangular film is folded as described above. Each of the edge portions of the first film 51 and the second film 52 after joined will be referred to hereinafter as a "sealed portion."

This method eliminates a need for provision of sealed portions for bonding between the first film 51 and the second film 52 in the part of the fold line X3-X3, which can further reduce the sealed portions in the case 50. It leads to further improvement in the volume energy density on the basis of the volume of the space for the electrochemical device 1 to be installed.

In the case of the present embodiment, as shown in FIGS. 1 and 2, each of one ends of the anode lead 12 connected to the anode 10, and the cathode lead 22 is arranged to project to the outside from the sealed portions resulting from the joining of the edge part 51B of the first film 51 and the edge part 52B of the second film 52 described above. The anode lead 12 and the cathode lead 22 are heat-sealed (thermally bonded) to the edge part 51B of the first film 51 and to the edge part 52B of the second film 52, using a mold 93 (cf. FIG. 15) as a heating member with an after-described groove formed therein. This secures sufficient hermetic seal of the case 50.

A film making the first film 51 and the second film 52 is a flexible film. Since the film is lightweight and is readily shaped into a thin film form, the electrochemical device 1 itself can be shaped into a thin film form. For this reason, it is feasible to readily improve the original volume energy density and also to readily improve the volume energy density on the basis of the volume of the space for the electrochemical device 1 to be installed.

There are no particular restrictions on this film as long as it is a flexible film. However, from the viewpoint of securing sufficient mechanical strength and lightweight of case 50, and the viewpoint of effectively preventing the invasion of water and air from the exterior of the case 50 into the interior of the case 50 and the dissipation of the electrolyte component from the interior of the case 50 to the exterior of the case 50, it is preferable to use a "composite packaging film" having at least an innermost layer of a synthetic resin in contact with the electrolyte solution, and a metal layer placed above the innermost layer.

Figure 6:
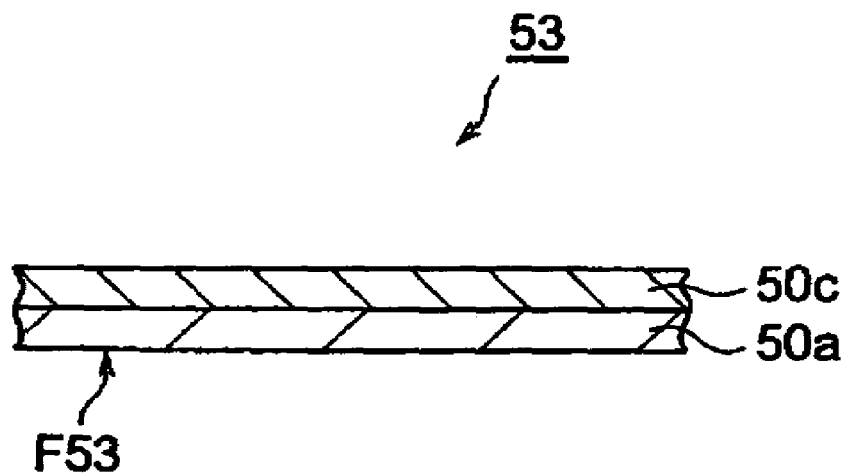
FIG. 6 is a schematic sectional view showing an example of a basic configuration of film as a constituent material of a case in the electrochemical device (electric double layer capacitor) shown in FIG. 1.
Figure 7:
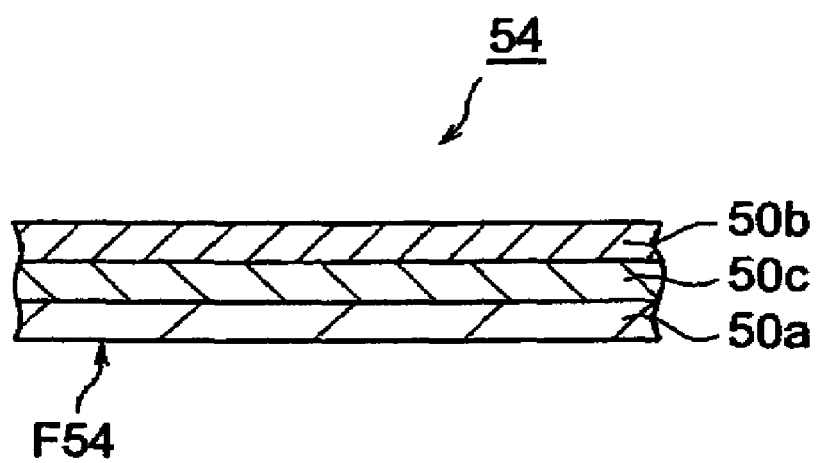
FIG. 7 is a schematic sectional view showing another example of a basic configuration of film as a constituent material of a case in the electrochemical device (electric double layer capacitor) shown in FIG. 1.

Examples of the composite packaging film applicable as the first film 51 and the second film 52 include composite packaging films of configurations shown in FIG. 6 and in FIG. 7.

The composite packaging film 53 shown in FIG. 6 has an innermost layer 50a of a synthetic resin with its inner surface F50a in contact with the electrolyte solution, and a metal layer 50c placed on another surface (outside surface) of the innermost layer 50a. The composite packaging film 54 shown in FIG. 7 has the configuration wherein an outermost layer 50b of a synthetic resin is further placed on an outside surface of the metal layer 50c in the composite packaging film 53 shown in FIG. 6.

There are no particular restrictions on the composite packaging film applicable as the first film 51 and the second film 52 as long as it is a composite packaging material having two or more layers consisting of at least one synthetic resin layer including the aforementioned innermost layer 50a, and the metal layer 50c such as metal foil. From the viewpoint of more securely achieving the effect as described above, the composite packaging film is more preferably comprised of three or more layers including the innermost layer 50a, the outermost layer 50b of synthetic resin placed on the outer surface side of the case 50 farthest from the innermost layer 50a, and at least one metal layer 50c placed between the innermost layer 50a and the outermost layer 50b, as the composite packaging film 54 shown in FIG. 7 is.

There are no particular restrictions on the innermost layer 50a as long as it is a layer with flexibility and is made of a constituent material of a synthetic resin being capable of exhibiting the flexibility and having chemical stability (properties of causing neither of chemical reaction, dissolution, and swelling) against the electrolyte solution used, and chemical stability against oxygen and water (water in air). It is preferable to employ a material further possessing a property of low permeability for oxygen, water (water in air), and the ingredients of the electrolyte solution. Examples of such materials include thermoplastic resins such as polyethylene, polypropylene, acid-modified polyethylene, acid-modified polypropylene, polyethylene ionomer, polypropylene ionomer, and so on.

In the case where the layer of synthetic resin like the outermost layer 50b is further provided besides the innermost layer 50a, as in the aforementioned composite packaging film 54 shown in FIG. 7, this synthetic resin layer may also be made of a constituent material similar to that of the innermost layer. Furthermore, this synthetic resin layer may be, for example, a layer of engineering plastic such as polyethylene terephthalate (PET) or polyamide (nylon).

The sealing method of all the sealed portions in the case 50 is preferably a heat seal (thermal bonding) method in terms of productivity. In the case of this electrochemical device, particularly, the sealed portions where the anode lead 12 and the cathode lead 22 project to the outside of the case 50 are sealed by the heat seal (thermal bonding) method.

The metal layer 50c is preferably a layer made of a metal material having corrosion resistance to oxygen, water (water in air), and the electrolyte solution. For example, it may be made using metal foil of aluminum, an aluminum alloy, titanium, nickel, or the like.

Figure 8:
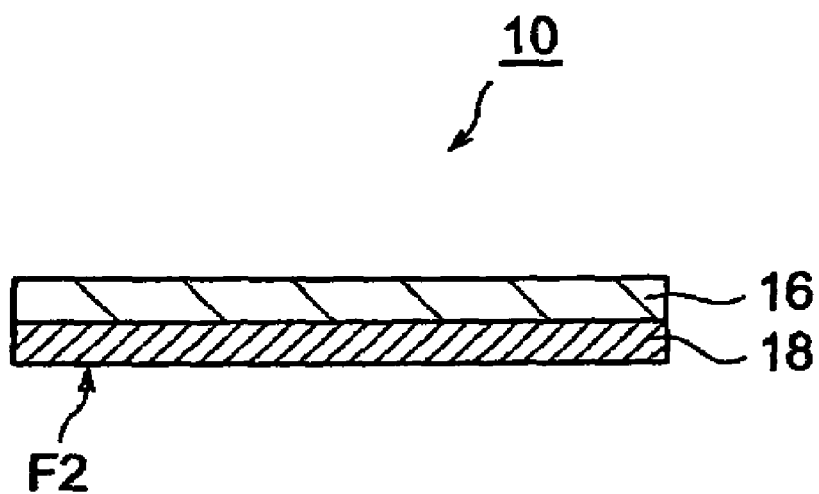
FIG. 8 is a schematic sectional view showing an example of a basic configuration of an anode in the electrochemical device (electric double layer capacitor) shown in FIG. 1.
Figure 9:
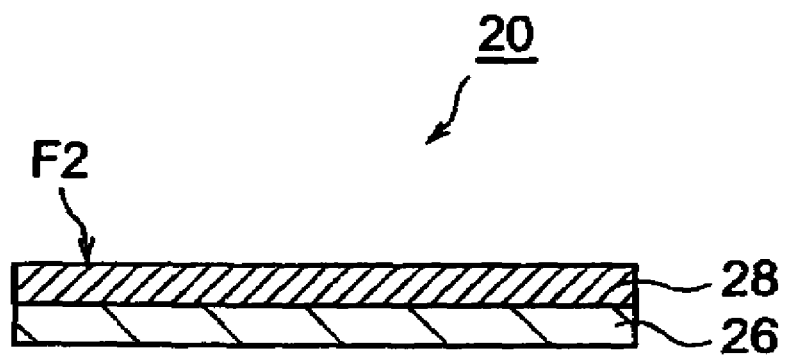
FIG. 9 is a schematic sectional view showing an is example of a basic configuration of a cathode in the electrochemical device (electric double layer capacitor) shown in FIG. 1.

Next, the anode 10 and cathode 20 will be described. FIG. 8 is a schematic sectional view showing an example of the basic configuration of the anode 10 in the electrochemical device shown in FIG. 1. FIG. 9 is a schematic sectional view showing an example of the basic configuration of the cathode 20 in the electrochemical device 1 shown in FIG. 1.

As shown in FIG. 8, the anode 10 is comprised of a collector layer 16 of a collector with electron conductivity, and a porous material layer 18 of a porous material with electron conductivity formed on the collector layer 16. As shown in FIG. 9, the cathode 20 is comprised of a collector 26, and a porous material layer 28 of a porous material with electron conductivity formed on the collector 26.

There are no particular restrictions on the collector layer 16 and on the collector 26 as long as they are conductors allowing sufficient movement of electric charge to the porous material layer 18 and to the porous material layer 28. They can be made using the collectors used in the well-known electric double layer capacitors. For example, the collector layer 16 and the collector 26 can be metal foil of aluminum or the like.

There are no particular restrictions on the constituent materials of the porous material layer 18 and the porous material layer 28 as long as they have the configuration containing at least particles of a porous material with electron conductivity, and a thermoplastic resin being capable of biding the particles of the porous material together and having the softening point $T_B$ lower than the softening point $T_S$ of the separator 40 described hereinafter. They can be made using a material similar to those used for the porous material layers forming the polarizable electrodes such as carbon electrodes in the well-known electric double layer capacitors.

The particles of the porous material with electron conductivity can be those of a material containing as a principal component, for example, a carbon material (e.g., activated charcoal) obtained by activating coking coal (e.g., petroleum coke produced by a delayed coker, using as stock oil, bottom oil of a fluidized catalytic cracker of petroleum heavy oil or residue oil of a reduced-pressure distillation apparatus, or the like).

Examples of the thermoplastic resin as a binder preferably applicable herein include fluororubber ($T_B$=200° C.), polytetrafluoroethylene ($T_B$=230° C., hereinafter referred to as "PTFE"), polyvinylidene fluoride ($T_B$=140° C., hereinafter referred to as "PVdF"), and polyvinylidene chloride ($T_B$=70° C., hereinafter referred to as "PVdC").

There are no particular restrictions on the other conditions (kinds of constituent materials except for the porous material particles and the thermoplastic resin as a binder, and their contents). For example, an electroconductivity subsidiary material (carbon black or the like) for imparting electroconductivity to carbon powder may be added.

There are no particular restrictions on the separator 40 placed between the anode 10 and the cathode 20, as long as it has the configuration with ion permeability and with electric insulation while having the softening point $T_S$ (>$T_B$) higher than the softening point $T_B$ of the thermoplastic resin included in the porous material layers described previously. It is possible to use the separator used in the electrochemical devices such as the well-known electric double layer capacitors.

For example, the separator 40 can be a film of polyethylene ($T_S$=120° C.), polypropylene ($T_S$=150° C.), or polyester ($T_S$=240° C.), a laminate of such films adjusted to have a softening point satisfying the condition of $T_S$>$T_B$, or a drawn film of a mixture of the above-stated synthetic resins adjusted to have a softening point so as to satisfy the condition of $T_S$>$T_B$. It may also be a nonwoven fiber fabric consisting of at least one constituent material selected from the group consisting of cellulose ($T_S$≧300° C.), polyester ($T_S$=240° C.), polypropylene, ($T_S$=150° C.), and aramid ($T_S$>250° C.) and adjusted to have a softening point so as to satisfy the condition of $T_S$>$T_B$.

Examples of preferred combinations of the separator 40 with the thermoplastic resin in the porous material layers satisfying the condition of $T_S$>$T_B$ include a combination of fluororubber and cellulose, a combination of PVdF and polyester, and so on.

The collector 28 of the cathode 20 is electrically connected to one end of the cathode lead 22, for example, made of aluminum, and the other end of the cathode lead 22 extends to the outside of the case 50. On the other hand, the collector 18 of the anode 10 is also electrically connected to one end of the anode lead conductor 12, for example, made of copper or nickel, and the other end of the anode lead conductor 12 extends to the outside of the case 14.

The interior space of the case 50 is filled with the electrolyte solution 30, and part of the electrolyte solution 30 is contained inside the anode 10 and cathode 20, and inside the separator 40.

There are no particular restrictions on the electrolyte solution 30, and it can be one of the electrolyte solutions used in the electrochemical devices such as the well-known electric double layer capacitors (aqueous electrolyte solutions, and electrolyte solutions using an organic solvent). In the case of the electric double layer capacitors, however, the aqueous electrolyte solutions have a low electrochemical decomposition voltage to restrict the withstand voltage of the capacitor to a low level, and it is thus preferable to employ an electrolyte solution using an organic solvent (a non-aqueous electrolyte solution).

Furthermore, there are no particular restrictions on the type of the electrolyte solution 30. In general, it is selected in view of the solubility of the solute, degree of dissociation, and the viscosity of the liquid and is desirably an electrolyte solution with high electric conductivity and with a wide potential window. For example, typical examples include those obtained by dissolving a quaternary ammonium salt, such as tetraethylammonium tetrafluoroborate, in an organic solvent such as propylene carbonate, diethylene carbonate, or acetonitrile. In this case, it is necessary to precisely control water mixed.

Furthermore, as shown in FIGS. 1 and 2, the part of the anode lead 12 in contact with the sealed portions of the case consisting of the edge part 51B of the first film 51 and the edge part 52B of the second film 52 is covered by an adhesive layer 14 consisting of an adhesive (insulator) for securing sufficient adhesion between the anode lead 12 and each film and for preventing electrical contact between the anode lead 12 and the metal layer 50c in the composite packaging film forming each film. In addition, the part of the cathode lead 22 in contact with the sealed portions of the case consisting of the edge part 51B of the first film 51 and the edge part 52B of the second film 52 is covered by an adhesive layer 24 consisting of an adhesive (insulator) for securing sufficient adhesion between the cathode lead 22 and each film and for preventing electrical contact between the cathode lead 22 and the metal layer 50c in the composite packaging film forming each film.

There are no particular restrictions on the adhesive as a constituent material of the adhesive layer 14 and the adhesive layer 24 as long as it is an adhesive containing a synthetic resin capable of adhering to both the metal and the synthetic resin. From the viewpoint of securing sufficient adhesion, it is preferable to adopt an adhesive containing as a constituent material at least one resin selected from the group consisting of modified polypropylene, modified polyethylene, and epoxy resin. The device may also be constructed without these adhesive layer 14 and adhesive layer 24 if it is possible to secure the adhesion of the composite packaging film to each of the anode lead 12 and the cathode lead 22 and to fully prevent the contact of the metal layer in the composite packaging film thereto.

The anode lead 12 and the cathode lead 22 are constructed of members of metal (e.g., aluminum or nickel).

Next, a production method (a preferred embodiment of the production method of the present invention) of electrochemical device 1 (electric double layer capacitor) will be described.

First, a preferred example of the production method of the electrochemical device base 60 (a laminate in which the anode 10, separator 40, and cathode 20 are successively stacked in this order) will be described.

The following will describe a preferred example of the production method where the electrodes serving as the anode 10 and cathode 20 are carbon electrodes (polarizable electrodes), on the basis of FIGS. 10 to 17.

Figure 10:
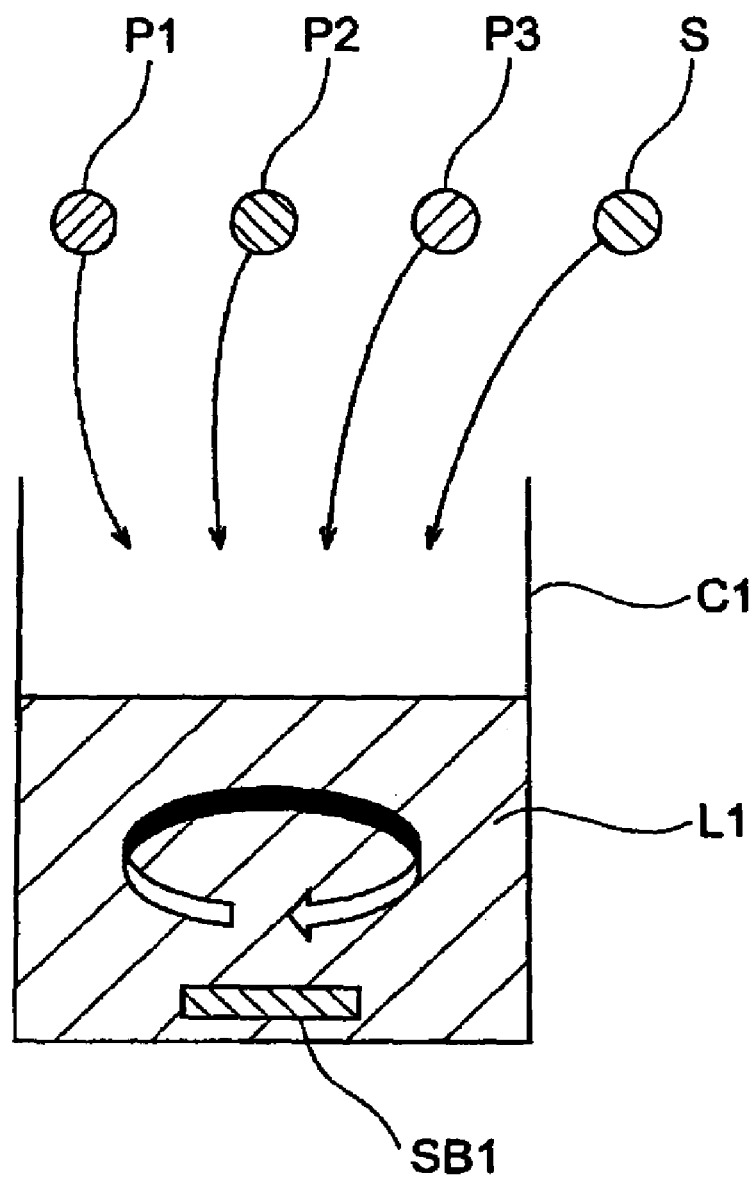
FIG. 10 is an illustration to illustrate a step of preparing a coating solution for formation of electrodes.
Figure 11:
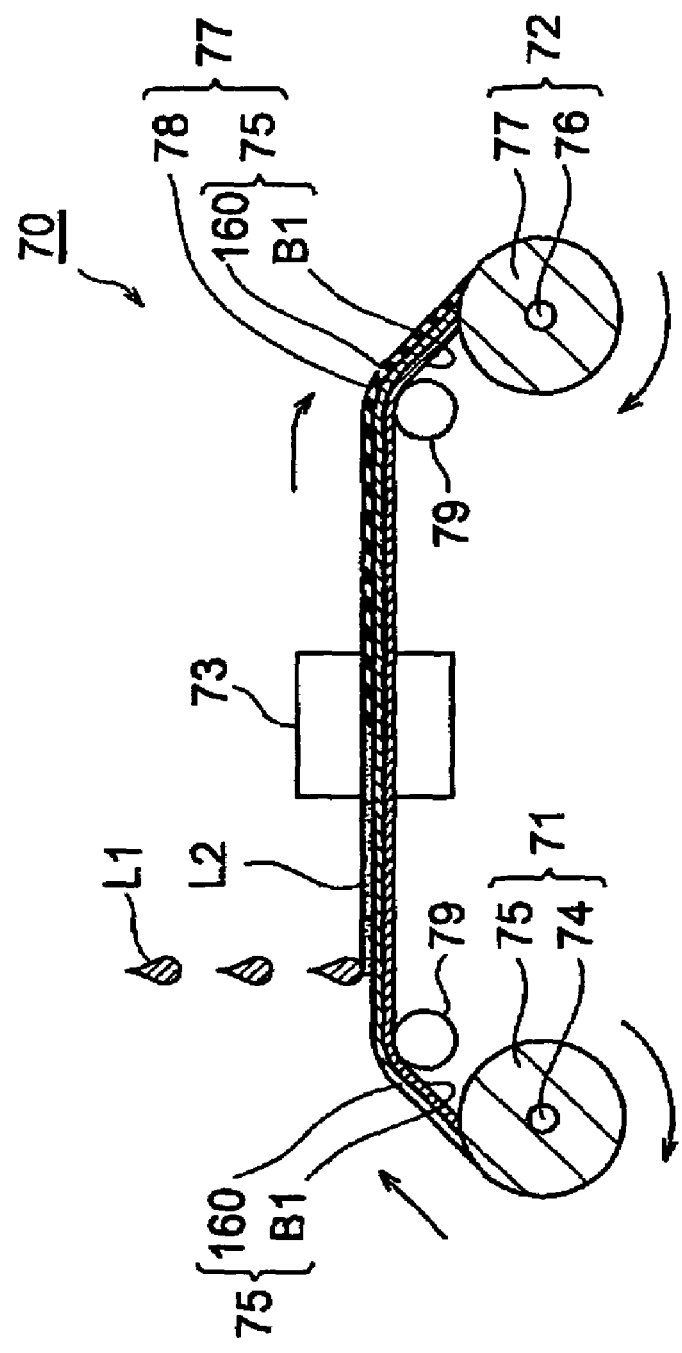
FIG. 11 is an illustration to illustrate a step of forming an electrode sheet, using the coating solution for formation of electrodes.
Figure 12:
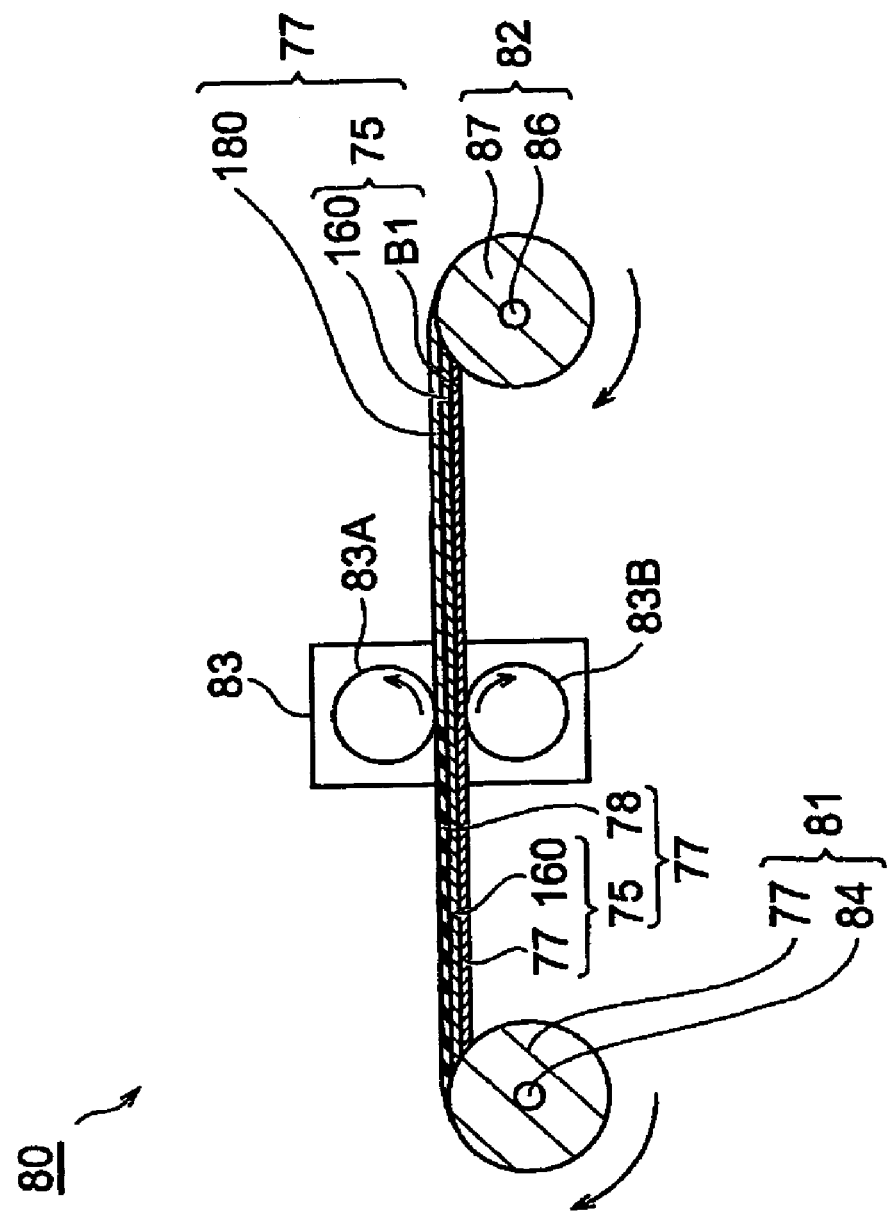
FIG. 12 is an illustration to illustrate a step of forming an electrode sheet, using the coating solution for formation of electrodes.
Figure 13:
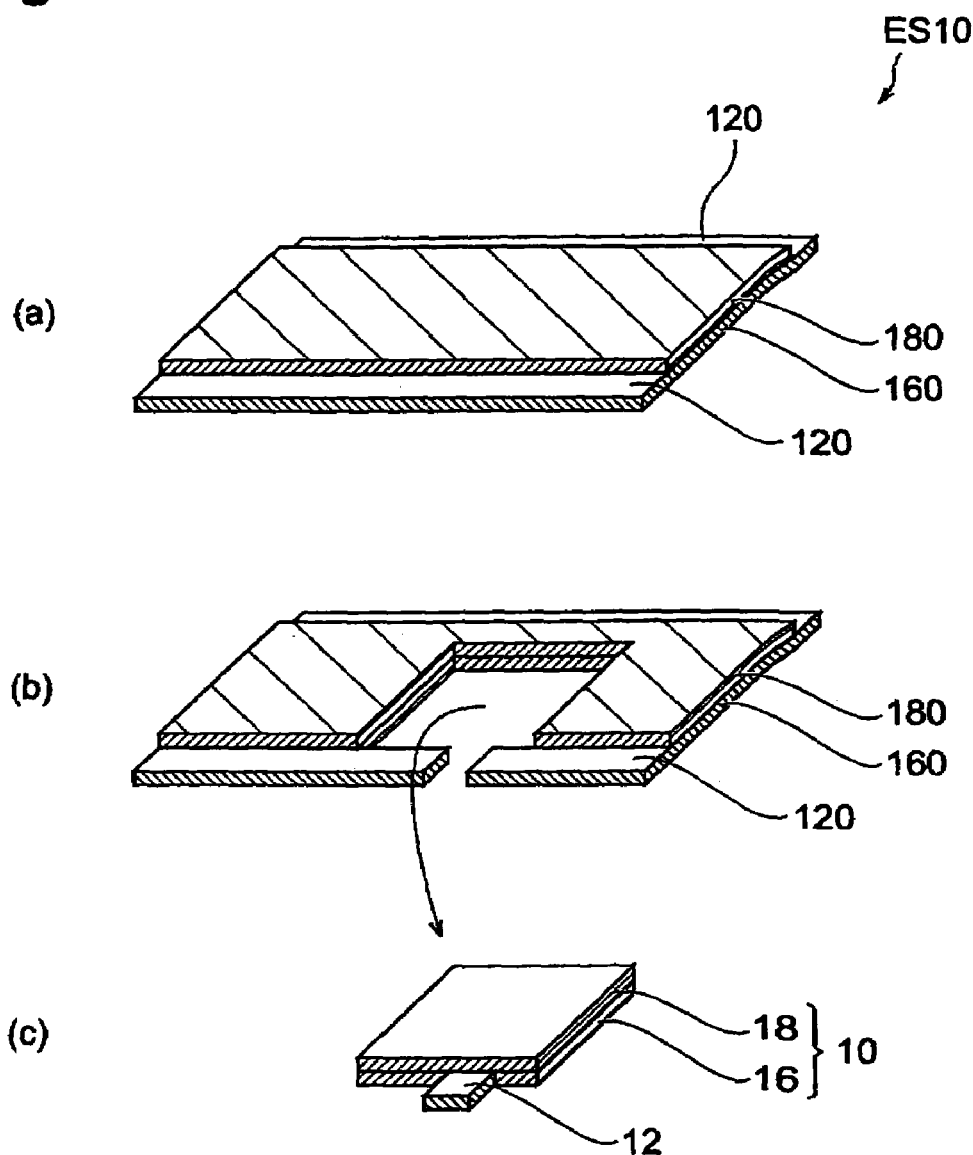
FIG. 13 is an illustration to illustrate a step of forming an electrode from an electrode sheet.

FIG. 10 is an illustration to illustrate a step of preparing a coating solution for formation of electrodes. FIG. 11 and FIG. 12 are illustrations to illustrate a step of forming an electrode sheet, using the coating solution for formation of electrodes. FIG. 13 is an illustration to illustrate a step of forming an electrode from the electrode sheet.

First, where the electrodes serving as anode 10 and cathode 20 are carbon electrodes, as shown in FIG. 10, a container C1 with a stirring bar SB1 therein is charged with particles P1 of a carbon material such as activated charcoal after an activation treatment in sizes of about 5 to 100 μm (porous material particles with electron conductivity), particles P2 of an electroconductivity subsidiary material (aforementioned carbon black, powder graphite, or the like), particles P3 of a thermoplastic resin as a binder (selected from PTFE, PVDF, PE, PP, fluororubber, etc. described previously and satisfying the condition of $T_S$>$T_B$), and a solvent S capable of dissolving the binder and dispersing the particles P1 and particles P2, and they are stirred well to prepare a coating solution for formation of electrodes.

In cases where the constituent materials of the anode 10 and cathode 20 are different, e.g., where a secondary battery is produced as an electrochemical device, two types of electrode-forming coating solutions containing particles of different constituent materials are prepared.

The electrodes may also be produced without preparing the above electrode-forming coating solution; for example, the carbon material is pulverized and controlled in grain sizes of about 5 to 100 μm, then the electroconductivity subsidiary material for imparting the electric conductivity to carbon powder and a binder (thermoplastic resin), for example, are added to the carbon powder, they are kneaded to prepare a kneaded product, and this kneaded product is rolled and drawn into a sheet form. In this case, the microparticles pulverized from the carbon material, and carbon black need to be uniformly distributed and to be entangled in the binder (thermoplastic resin) of PTFE fibers or the like at almost equal strength, and it is thus preferable to kneaded the components well and to repetitively perform rolling and drawing lengthwise and crosswise in general.

Next, an electrode sheet is formed using the foregoing electrode-forming coating solution and apparatus 70 and apparatus 80 as shown in FIG. 11 and in FIG. 12. The following will describe methods of forming an electrode sheet ES10 for anode 16 (cf. FIG. 13) and forming the anode 10 from the electrode sheet ES10, and will omit a method of forming the cathode 20 having much the same configuration as the anode 10.

The apparatus 70 shown in FIG. 11 is comprised chiefly of a first roll 71, a second roll 72, a drier 73 placed between the first roll 71 and the second roll 72, and two support rolls 79. The first roll 71 is comprised of a core 74 of cylindrical shape and a laminate sheet 75 of tape shape. One end of this laminate sheet 75 is connected to the core 74 and the laminate sheet 75 is wound on the core 74. Furthermore, the laminate sheet 75 has a configuration in which a metal foil sheet 160 is laid on a substrate sheet B1.

The second roll 72 has a core 76 of cylindrical shape to which the other end of the laminate sheet 75 is connected. Furthermore, a core-driving motor (not shown) for rotating the core 76 is connected to the core 76 of the second roll 72, so that a laminate sheet 77, after-a process of coating with the coating solution L1 for formation of electrodes and further drying in the drier 73 can be wound at a predetermined speed.

First, as the core-driving motor rotates, the core 76 of the second roll 72 rotates to draw the laminate sheet 75 wound on the core 74 of the first roll 71, to the outside of the first roll 71. Then the electrode-forming coating solution L1 is applied onto the metal foil sheet 160 of the laminate sheet 75 thus drawn out. This results in forming a coating film L2 of the electrode-forming coating solution L1 on the metal foil sheet 160. With the rotation of the core-driving motor, the part of the laminate sheet 75 with the coating film L2 thereon is guided into the drier 73 by the support rolls 79. The coating film L2 on the laminate sheet 75 is dried in the drier 73 to become a layer 78 as a precursor for the porous material layer 18 in an electrode (hereinafter referred to as "precursor layer 78"). With the rotation of the core-driving motor, the laminate sheet 77 resulting from the formation of the precursor layer 78 on the laminate sheet 75 is guided onto the core 76 by the support rolls 79 to be wound thereon.

Next, an electrode sheet ES10 is fabricated using the above laminate sheet 77 and the apparatus 80 shown in FIG. 12.

The apparatus 80 shown in FIG. 12 is comprised chiefly of a first roll 81, a second roll 82, and a roll press machine 83 placed between the first roll 81 and the second roll 82. The first roll 81 is comprised of a core 84 of cylindrical shape and the laminate sheet 77 of tape shape as described previously. One end of this laminate sheet 77 is connected to the core 84 and the laminate sheet 77 is wound on the core 84. The laminate sheet 77 has the configuration in which precursor layer 78 is further laid on the laminate sheet 75 in which the metal foil sheet 160 is laid on the substrate sheet B1.

The second roll 82 also has a core 86 of cylindrical shape to which the other end of the laminate sheet 77 is connected. Furthermore, a core-driving motor (not shown) for rotating the core 86 is connected to the core 86 of the second roll 82, so that a laminate sheet 87 after a thermal treatment and pressing process in the roll press machine 83 can be wound at a predetermined speed.

First, as the core-driving motor rotates, the core 86 of the second roll 82 rotates to draw the laminate sheet 77 wound around the core 84 of the first roll 81, to the outside of the first roll 81. With the rotation of the core-driving motor, the laminate sheet 77 is then guided into the roll press machine 83. Two cylindrical roller 83A and roller 83B are placed in the roll press machine 83. The roller 83A and roller 83B are arranged so that the laminate sheet 77 can be inserted into between these rollers.

Then the press machine is so set as to establish a state in which the side face of the roller 83A comes into contact with the outer surface of the precursor layer 78 of the laminate sheet 77 and in which the side face of the roller 83B comes into contact with the outer surface (back surface) of the substrate sheet B1 of the laminate sheet 77, on the occasion of inserting the laminate sheet 77 into between the roller 83A and roller 83B, and as to be able to perform a thermal treatment while pressing the laminate sheet 77 at a predetermined temperature and a predetermined pressure.

Each of the cylindrical roller 83A and roller 83B is provided with a rotating mechanism for rotating the roller in the direction according to the moving direction of the laminate sheet 77. Furthermore, each of the cylindrical roller 83A and roller 83B has such size that the length between its bottom faces is not less than the width of the laminate sheet 77.

In the roll press machine 83, the precursor layer 78 on the laminate sheet 77 is heated and pressed according to need to become a porous material layer 180 (porous material layer 18 in the case of the anode). With the rotation of the core-driving motor, a laminate sheet 87 resulting from the formation of the porous material layer 180 on the laminate sheet 77 is wound onto the core 86.

Next, the laminate sheet 87 wound on the core 86 is cut into a predetermined size to obtain an electrode sheet ES10, as shown in FIG. 13(*a*). In the case of the electrode sheet ES10 shown in FIG. 13(*a*), the edge parts 120 where the surface of the metal foil sheet 160 is exposed is formed. The edge parts 120 can be formed by controlling the application of the electrode-forming coating solution L1 onto the metal foil sheet 160 of the laminate sheet 75 so as to apply the electrode-forming coating solution L1 onto only the central region of the metal foil sheet 160.

Then the anode 10 shown in FIG. 13(*c*) is stamped out from the electrode sheet ES10, as shown in FIG. 13(*b*), in accordance with the scale of the electrochemical device to be produced. At this time, the electrode sheet ES10 is punched so as to include the aforementioned portion of edge part 120 as the anode lead 12, whereby the anode 10 can be obtained in a state in which the anode lead 12 is preliminarily integrated. In the case where the anode lead conductor 12 and the cathode lead 22 are not connected to the electrodes, the anode lead conductor 12 and the cathode lead 22 are separately prepared and are electrically connected to the anode 10 and to the cathode 20, respectively.

Figure 14:
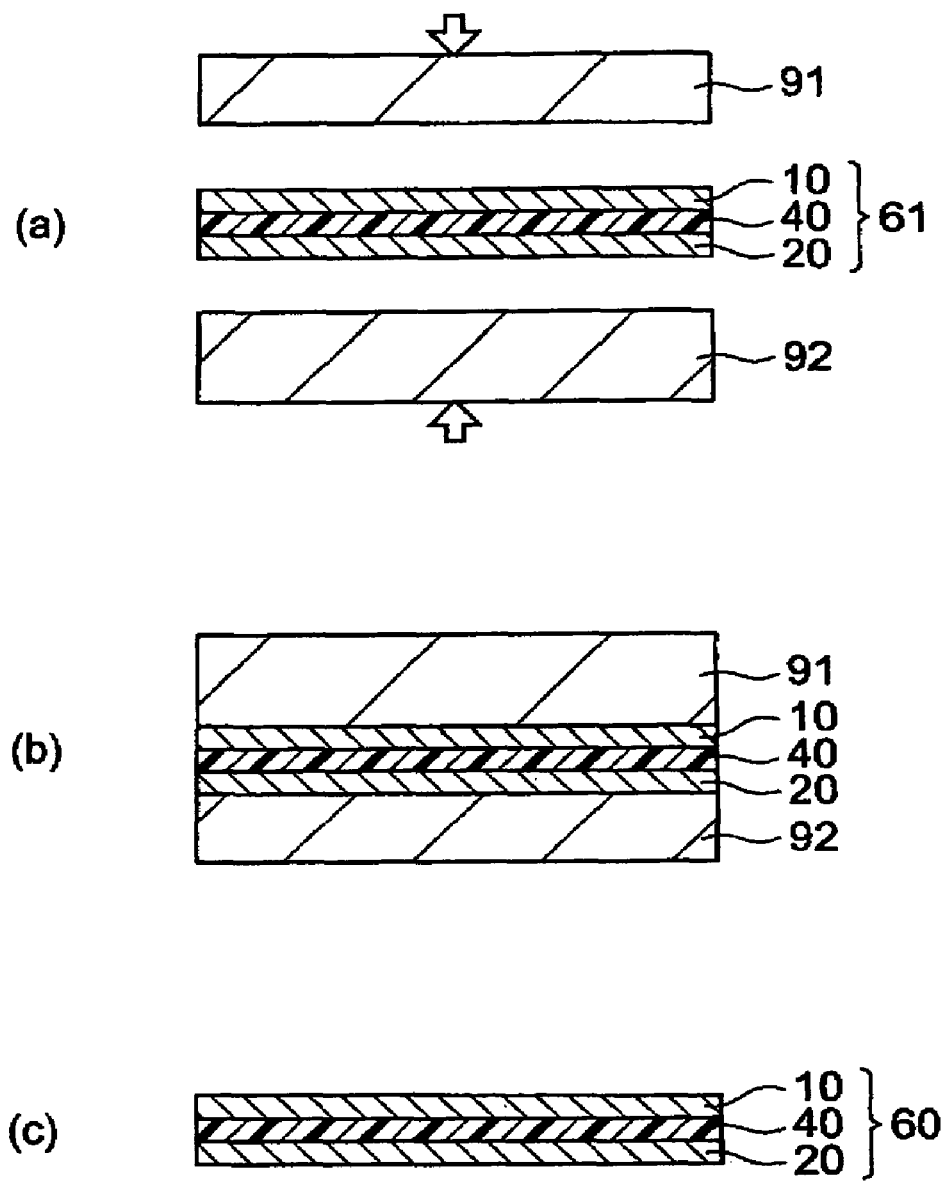
FIG. 14 is an illustration to illustrate an example of procedure of a thermal treatment step in the present invention.

Then the separator 40 separately prepared is placed between the anode 10 and the cathode 20 in a state of contact therewith, and the laminate is subjected to a thermal treatment step in the present invention, thereby completing the electrochemical device base 60. This thermal treatment step will be described on the basis of FIG. 14. FIG. 14(*a*) to FIG. 14(*c*) are illustrations to illustrate an example of procedure of the thermal treatment step in the present invention.

First, the separator 40 is placed between the anode 10 and the cathode 20 to obtain a laminate 61. In this laminate 61, the separator 40 is placed in a state of contact with the anode 10 and cathode 20, but is not in a state in which it is bonded thereto by thermal compression or the like.

Next, as shown in FIG. 14(a), the laminate 61 is placed between a mold 91 of plate shape and a mold 92 of plate shape being a pair of heating members. The surface (heating surface) of the mold 91 in contact with the laminate 61 and the surface (heating surface) of the mold 92 in contact with the laminate 61 are set to be not less than the size of laminate 61.

Next, as shown in FIG. 14(b), a thermal treatment is carried out so as to heat the laminate at the thermal treatment temperature T1 satisfying the condition of Formula (1) below while pressing the laminate 61 in a sandwiched state thereof between the mold 91 and the mold 92. This obtains the electrochemical device base 60 being a laminate in a state in which the collector 16 of the anode 10, the porous material layer 18 of the anode 10, the separator 40, the porous material layer 28 of the cathode 20, and the collector 26 of the cathode 20 are integrated. In Formula (1), $T_S$ represents the softening point of the separator, and $T_B$ the softening point of the thermoplastic resin.

$$T_B \leq T1 < T_S \quad (1)$$

Since this thermal treatment step is adapted to prevent softening of the separator 40, it can adequately prevent the closure of the pores inside the separator 40. For this reason, it is feasible to secure sufficient ion conductivity in the electrolyte impregnated in the separator 40.

In this thermal treatment step, the thermoplastic resin existing in the vicinity of the surface of the porous material layer 18 softens, so that the surface of the porous material layer 18 (the surface on the side in contact with the separator 40) is deformed to fit the shape of uneven part of the surface of the separator 40. For this reason, the porous material layer 18 and the separator 40 can be fully adhered to each other.

Furthermore, the thermal treatment step softens the thermoplastic resin existing in the vicinity of the surface of the porous material layer 18, so that the surface of the porous material layer 18 (the surface on the side in contact with the collector 16) is deformed to fit the shape of uneven part in the surface of the collector 16. For this reason, it becomes feasible to more securely adhere the porous material layer 18 and the collector 16 in a state in which their electrical contact is fully held.

The thermal treatment step also softens the thermoplastic resin existing in the vicinity of the surface of the porous material layer 28, so that the surface of the porous material layer 28 (the surface on the side in contact with the separator 40) is deformed to fit the shape of uneven part in the surface of the separator 40. For this reason, it is feasible to fully adhere the porous material layer 28 and the separator 40 to each other.

Furthermore, the thermal treatment step softens the thermoplastic resin existing in the vicinity of the surface of the porous material layer 28, so that the surface of the porous material layer 28 (the surface on the side in contact with the collector 26) is deformed to fit the shape of uneven part in the surface of the collector 26. For this reason, it becomes feasible to more securely adhere the porous material layer 28 and the collector 26 in a state in which their electrical contact is fully held.

Therefore, even in cases where the anode 10, separator 40, and cathode 20 are integrated in close contact by the thermal treatment, it is feasible to readily and securely form the electrochemical device 1 capable of achieving satisfactory charge/discharge characteristics.

Next, a production method of case 50 will be described. First, where the first film and the second film are made from the aforementioned composite packaging film, the case is fabricated by a known production method such as the dry lamination process, the wet lamination process, the hot melt lamination process, or the extrusion lamination process.

For example, first prepared are a film becoming the layer of synthetic resin forming the composite packaging film, and a metal foil sheet of aluminum or the like. The metal foil sheet can be prepared, for example, by rolling a metal material.

Then the composite packaging film (multilayer film) is fabricated, for example, by bonding the metal foil sheet through an adhesive onto the film becoming the layer of synthetic resin, preferably, so as to form the configuration consisting of a plurality of layers as described previously. Then the composite packaging film is cut into a predetermined size to prepare a rectangular film.

Then the film is folded, as described previously with reference to FIG. 2, and the electrochemical device base 60 is placed therein.

Next, a thermal bonding process is carried out according to the following procedure, for the portions where the first lead and the second lead are placed between the edge part of the first film 51 to be thermally bonded (sealed portion 51B) and the edge part of the second film 52 to be thermally bonded (sealed portion 52B), among the contact portions to be thermally bonded in the first film 51 and the second film 52.

Figure 15:
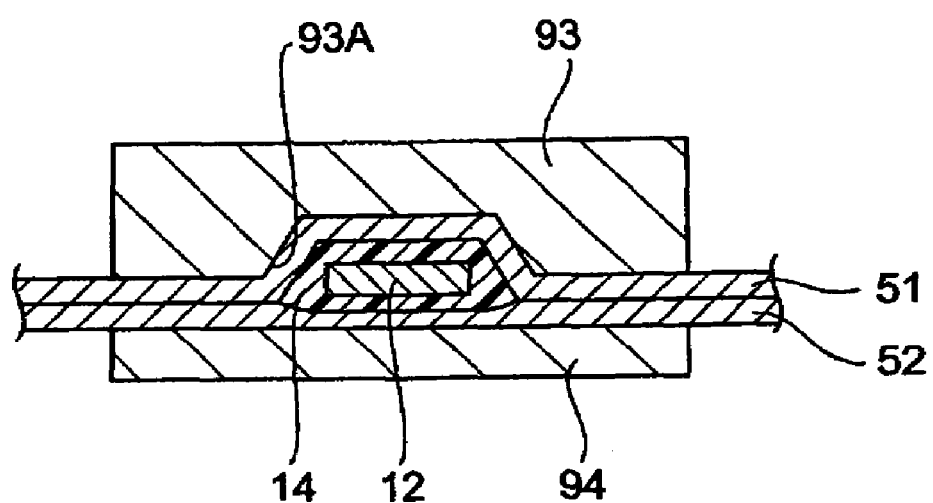
FIG. 15 is an illustration to illustrate a procedure in which the periphery of anode lead conductor 12 is thermally bonded to first film 51 and to second film 52 by a thermal bonding step

The thermal bonding process will be described below using an example where the periphery of the anode lead conductor 12 is thermally bonded to the first film 51 and to the second film 52, based on FIG. 15. FIG. 15 is an illustration to illustrate the procedure in the case where the periphery of the anode lead conductor 12 is thermally bonded to the first film 51 and to the second film 52 by the thermal bonding step.

First, as shown in FIG. 15, with use of a first thermal-bonding mold 93 as a heating remember with a groove 93A (recess) in the shape and size matching the shape and size of the cross section of the anode lead 12 to be used, and a second thermal-bonding mold 94 of flat plate shape as a heating member, the laminate consisting of the part to be thermally bonded in the sealed portion 51B of the first film 51, the anode lead 12, and the part to be thermally bonded in the sealed portion 52B of the second film 52 is placed between the molds. In the case of FIG. 15, the shape and size of the groove 93A are defined as approximately trapezoidal, in consideration of the thickness and cross-sectional shape of the first film 51 to be adhered as thermally deformed to the anode lead 12.

As shown in FIG. 15, the surface of the anode lead 12 is preferably coated with the adhesive described previously, in terms of more securely achieving the sufficient hermitic seal of the case 50. This results in forming an adhesive layer 14 of the adhesive contributing to the adhesion between the anode lead 12 and the first film 51 and between the anode lead 12 and the second film 52, after the thermal bonding step.

Instead of the configuration of providing only the first thermal-bonding mold 93 as a heating member with the groove 93A (recess), the second thermal-bonding mold 94 as a heating member may also be provided with a groove taking account of the thickness of the first film 51 and the shape and size of groove 93A.

Next, in a state in which the contact portions of the first film 51 and the second film 52 are pressed, as shown in FIG.

15, at least one of the first thermal-bonding mold 93 and the second thermal-bonding mold 94 is heated to melt the foregoing contact portions to thermally bond the first film 51 and the second film 52 to each other.

The thermal bonding process is also carried out for the part of the periphery of the cathode lead 22 according to a procedure similar to the procedure described above, at the same time as or separately from the above thermal bonding process, whereby the case 50 can be formed with the sufficient hermetic seal. In the case where the thermal bonding process for the part of the periphery of the cathode lead 22 is carried out simultaneously with the thermal bonding process for the part of the periphery of the anode lead 12, it can be done, for example, by additionally forming a groove in the first thermal-bonding mold 93.

In the sealed portion 51B (edge part 51B) of the first film 51 and the sealed portion 52B (edge part 52B) of the second film, the portions except for the part of the periphery of the anode lead 12 and the part of the periphery of the cathode lead 22 described above are then heat-sealed (thermally bonded), for example, across a desired seal width under a predetermined heating condition by means of a sealing machine.

Figure 16:
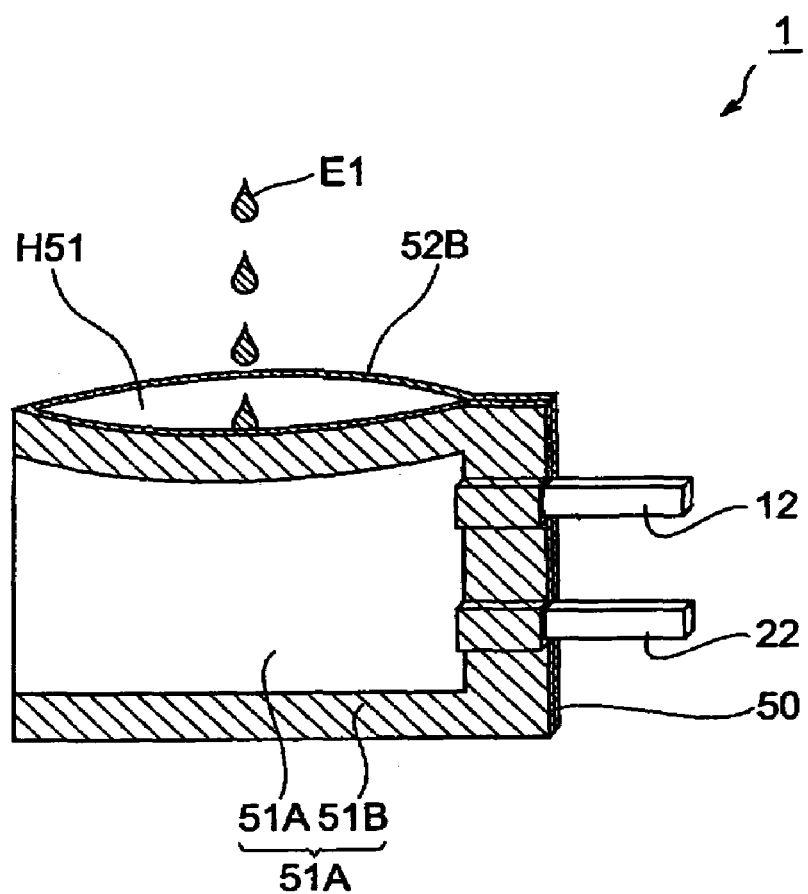
FIG. 16 is an illustration to show an example of procedure of filling an electrolyte solution in a case.

At this time, a portion is not heat-sealed in order to secure an opening H51 for injection of the electrolyte solution 30, as shown in FIG. 16. This obtains the case 50 in a state with the opening H51.

Figure 17:
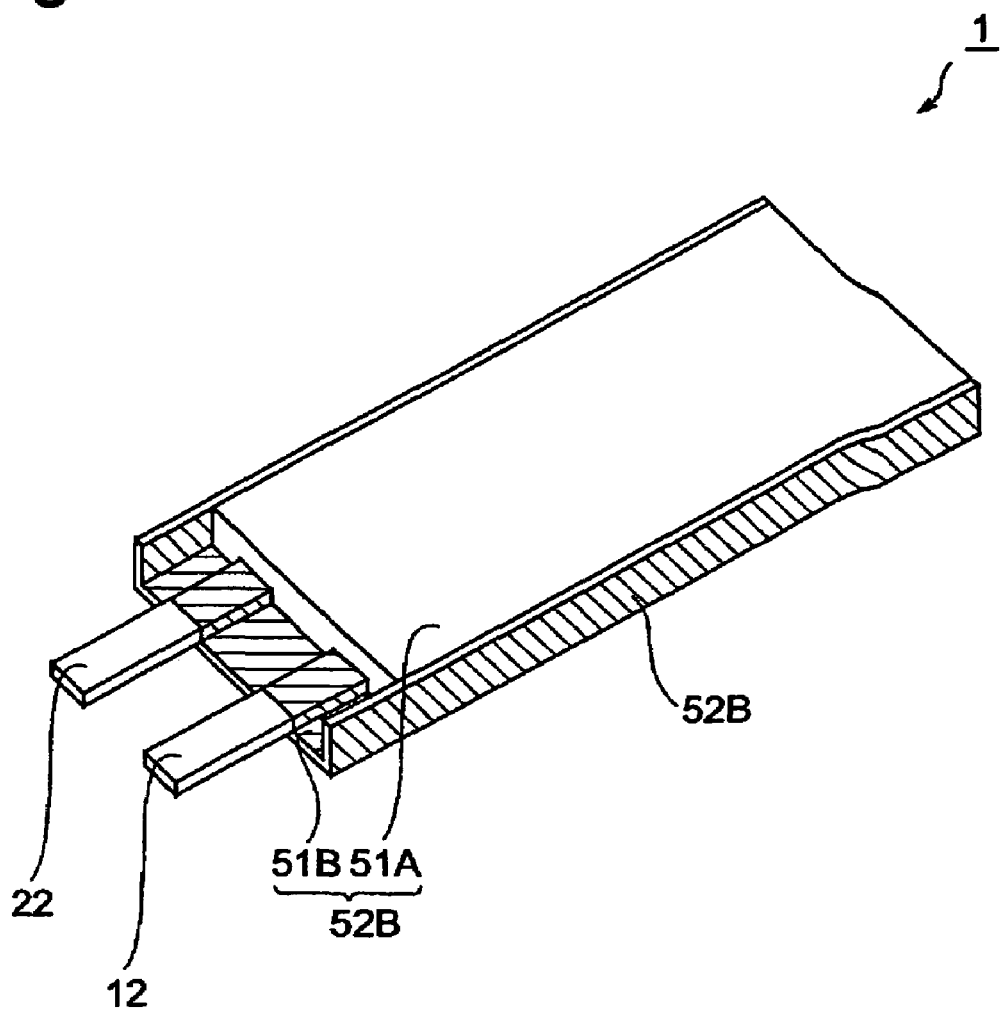
FIG. 17 is a perspective view showing an electrochemical device where sealed portions of a case are folded.

Then the electrolyte solution 30 is poured through the opening H51 into the case, as shown in FIG. 16. Subsequently, the opening H51 of the case 50 is sealed by means of a reduced-pressure sealing machine. Furthermore, as shown in FIG. 17, the sealed portions of the case 50 are bent according to need, in terms of improving the volume energy density on the basis of the volume of the space for the resultant electrochemical device 1 to be installed. This completes the fabrication of the case 50 and the electrochemical device 1 (electric double layer capacitor).

The preferred embodiment of the present invention was described above in detail, but it is noted that the present invention is by no means intended to be limited to the above embodiment. For example, the electrochemical device 1 may be constructed in a more compact configuration by folding the sealed portions thereof, in the description of the above embodiment.

The above embodiment described the electrochemical device 1 with the anode 10 and cathode 20 one each, but the electrochemical device may also be constructed in a configuration consisting of a laminate of five or more layers in, each of which the anode 10 and cathode 20 are provided one or more each and in which one separator 40 is placed between each set of anode 10 and cathode 20.

Furthermore, the above embodiment described the case wherein the thermal treatment in the thermal treatment step according to the present invention is carried out for the laminate of the anode 10 obtained by stamping out it from the electrode sheet ES10 for the anode as shown in FIG. 13(a), the cathode 20 obtained by stamping out it from the electrode sheet for the cathode not shown, and the separator 40, but the production method of the present invention is not limited to this case. For example, it is also possible to form a laminate in which the separator 40 in the same size as that of the anode electrode sheet and the cathode electrode sheet is placed between the anode electrode sheet ES10 and the cathode electrode sheet, and to subject the laminate to the thermal treatment in the thermal treatment step according to the present invention. In this case, the electrochemical device base can be obtained in a desired size by stamping out it from a large electrochemical device base obtained after the thermal treatment step.

For example, the above embodiment mainly described the case where the electric double layer capacitor was produced by the production method of the present invention, but the electrochemical devices to be produced by the production method of the present invention are not limited to the electric double layer capacitors; for example, the production method of the present invention is also applicable to production of electrochemical capacitors such as pseudo capacitance capacitors, pseudocapacitors, and redox capacitors.

Furthermore, the production method of the present invention is also applicable to production of secondary batteries such as a lithium ion secondary battery in a configuration which has a first electrode and a second electrode facing each other, a separator adjacently placed between the first electrode and the second electrode, and an electrolyte solution and in which these are housed in a case made of a flexible film, and to production of primary batteries.

For example, in a case where the first electrode is used an anode and the second electrode as a cathode, particles of an electrode-active material for the anode (or particles containing an electrode-active material for the anode) may be used as the porous material particles with electron conductivity in the porous material layer of the anode. In this case, particles of an electrode-active material for the cathode (or particles containing an electrode-active material for the cathode) may be used as the porous material particles with electron conductivity in the porous material layer of the cathode.

In the present invention the case may also be an envelope of can shape made of a metal member (metal case), as well as the case made of the foregoing composite packaging film. This makes it possible to apply the device to use in cases requiring higher mechanical strength of the case than the composite packaging film.

EXAMPLES

The details of the electrochemical device of the present invention will be described below in further detail with examples and comparative examples thereof, but it is noted that the present invention is by no means intended to be limited to these examples.

Example 1

An electrochemical device (electric double layer capacitor) having a configuration similar to that of the electrochemical device shown in FIG. 1 was fabricated according to the procedure described below.

(1) Fabrication of Electrodes

The anode (polarizable electrode) and the cathode (polarizable electrode) were fabricated according to the procedure below. First, an activated carbon material (activated charcoal) after an activation treatment, a thermoplastic resin {fluororubber ($T_g$=200° C.)} as a binder, and an electroconductivity aid (carbon black) were mixed in a mass proportion of carbon material:electroconductivity aid:binder=8:1:1, and this mixture was put into a solvent of MIBK (methyl isobutyl ketone) and they were mixed, thereby preparing a coating solution for formation of electrodes (hereinafter referred to as "coating solution L1").

Next, this coating solution L1 was uniformly applied onto one surface of a collector (thickness: 50 μm) of aluminum foil. Thereafter, a drying process was carried out to remove MIBK from the coating film. Furthermore, mill rolls were used to press the laminate of the collector and the coating film after dried, thereby fabricating an electrode in which a porous material layer (thickness: 37 μm) with electron conductivity was formed on one surface of the collector (thickness: 50 μm) of aluminum foil (hereinafter referred to as "electrode E1"). Then this electrode E1 was cut into a rectangular shape (size: 8.0 mm×8.0 mm) and vacuum drying was carried out at temperatures of 150° C. to 175° C. for twelve or more hours to remove water adsorbed to the surface of the porous material layer with electron conductivity. Then blanking was carried out to fabricate the anode and the cathode to be mounted on the electrochemical device of Example 1, in the size adjusted.

On the occasion of applying the coating solution L1 onto the aluminum foil, the coating solution L1 was controlled so as not to be applied onto the edge part of the aluminum foil, thereby obtaining the anode and the cathode preliminarily integrated with a lead (width: 2 mm, length: 8 mm, and thickness: 50 μm) shown in FIG. 13(c).

(2) Fabrication of Electrochemical Device

First, the separator (8.4 mm×8.4 mm square and thickness: 0.05 mm) of nonwoven fabric of regenerated cellulose was placed between the anode and the cathode facing each other, to form a laminate in which the anode, the separator, and the cathode were successively stacked in this order {in a configuration similar to the laminate 61 shown in FIG. 14(a)}.

Then the thermal treatment and the pressing process of the above laminate were simultaneously carried out, using a means for carrying out the thermal treatment and the pressing process (hot press) shown in FIG. 14 (thermal treatment step). The thermal treatment temperature T1 was 230° C., the pressure 90 kg/cm², and the treatment time 40 seconds.

It was confirmed that the separator of the nonwoven fabric of regenerated cellulose did not soften in the thermal treatment step. It was also confirmed by SEM photography of cross sections of the separator that its pores were not closed inside the separator of the nonwoven fabric of regenerated cellulose after the thermal treatment step. This verified that the softening point $T_S$ of the separator of the regenerated cellulose nonwoven fabric was at least higher than the softening point $T_B$ of the thermoplastic resin (fluororubber) as a binder contained in each porous material layer of the anode and cathode (i.e., it satisfies the condition of $T_S > T_B$ and the condition represented by Formula (1)).

Next, prepared as a composite packaging film with flexibility was a laminate (thickness: 20 μm and size: 14.0 mm×28.0 mm) in which an innermost layer of a synthetic resin to come into contact with the electrolyte solution (a layer of polypropylene, thickness: 40 μm), a metal layer of aluminum foil (thickness: 40 μm), and a layer of polyamide (thickness: 20 μm) were successively stacked in this order.

Then the composite packaging film was folded into two film parts and the electrochemical device base 60 was placed therein.

On that occasion, each of the periphery of the anode lead and the periphery of the cathode lead was covered by acid-modified polypropylene film (thickness: 50 μm) as the aforementioned adhesive layer 14 and adhesive layer 24.

Then the thermal bonding process was carried out around the anode lead and around the cathode lead according to procedure similar to the procedure described previously on the basis of FIG. 15. The sectional shape of the groove 93A of the first thermal-bonding mold 93 was the trapezoidal shape (upper base: 2.3 mm, lower base; 2.5 mm, height (thickness): 0.50 mm) similar to that shown in FIG. 15.

In the sealed portions of the two film parts of the composite packaging film, the portions except for the part around the anode lead 12 and the part around the cathode lead 22 described above were then heat-sealed (thermally bonded) in the seal width of 2 mm by means of a sealing machine. At this time, a part was not heat-sealed, in order to secure an opening for injection of the electrolyte solution 30, as shown in FIG. 16

Then the electrolyte solution (propylene carbonate solution of triethylmethylammonium tetrafluoroborate of 1.2 mol/L) was poured through the opining into the case. Subsequently the opening H51 of the case 50 was sealed by means of a reduced-pressure sealing machine. The electrochemical device was fabricated as described above.

Example 2

An electrochemical device was fabricated in the same procedure and conditions as the electrochemical device of Example 1, except that the thermal treatment temperature T1 in the thermal treatment step was 200° C.

Example 3

An electrochemical device was fabricated in the same procedure and conditions as the electrochemical device of Example 1, except that the pressure of the pressing process in the thermal treatment step was 60 kg/cm².

Example 4

An electrochemical device was fabricated in the same procedure and conditions as the electrochemical device of Example 1, except that the thermal treatment temperature T1 in the thermal treatment step was 200° C. and the pressure in the pressing process was 60 kg/cm².

Example 5

An electrochemical device was fabricated in the same procedure and conditions as the electrochemical device of Example 1, except that the separator made of nonwoven fabric of aramid fiber (8.4 mm×8.4 mm, thickness: 0.03 mm, $T_S > 250°$ C.) was used.

Example 6

An electrochemical device was fabricated in the same procedure and conditions as the electrochemical device of Example 1, except that the thermoplastic resin as a binder contained in each porous material layer of the anode and cathode was PVdF (polyvinylidene fluoride, $T_B = 140°$ C.) and the thermal treatment temperature T1 in the thermal treatment step was 170° C.

Comparative Example 1

An electrochemical device was fabricated in the same procedure and conditions as the electrochemical device of Example 1, except that the thermal treatment temperature T1 in the thermal treatment step was 150° C.

Comparative Example 2

An electrochemical device was fabricated in the same procedure and conditions as the electrochemical device of Example 1, except that the pressure in the pressing process in the thermal treatment step was 30 kg/cm².

Comparative Example 3

An electrochemical device was fabricated in the same procedure and conditions as the electrochemical device of Example 1, except that the separator of a microporous film of polypropylene (8.4 mm×8.4 mm, thickness: 0.05 mm, $T_S$=150° C.) was used and the thermal treatment temperature T1 in the thermal treatment step was 120° C. It was confirmed that the separator of the microporous film of polypropylene softened in the thermal treatment step.

Comparative Example 4

An electrochemical device was fabricated in the same procedure and conditions as the electrochemical device of Example 1, except that the separator of nonwoven fabric of polypropylene (8.4 mm×8.4 mm, thickness: 0.05 mm, $T_S$=150° C.) was used and the thermal treatment temperature T1 in the thermal treatment step was 120° C. It was confirmed that the separator of the nonwoven fabric of polypropylene softened in the thermal treatment step.

Comparative Example 5

An electrochemical device was fabricated in the same procedure and conditions as the electrochemical device of Example 1, except that the thermal treatment step which was carried out in Example 1 was not carried out.

[Characteristic Evaluation Tests of Electrochemical Devices]

The equivalent series resistance and capacitor capacitance were measured for each of the electrochemical devices (electric double layer capacitors) of Example 1 to Example 6 and Comparative Example 1 to Comparative Example 5

First, a charge/discharge tester was used to carry out constant-current charge of 0.5 C and to monitor an increase of voltage according to storage of charge in each electric double layer capacitor. When the potential reached 2.5 V, the charge process transferred into constant-voltage charge (relaxation charge). When the electric current became one tenth of the charge current, the charge was terminated. The total charge time at this time (i.e., charge time+relaxation charge time) is dependent upon electric capacitance of the cell. Then discharge was also carried out by constant-current discharge of 0.5 C and the terminal voltage was 0 V. After this test, charge was carried out by an electric current of 1 C. After the potential reached 2.5 V, the charge process transferred into constant-voltage charge. When the electric current became one tenth of the charge current, the charge was terminated. Then discharge was also carried out by constant-current discharge of 1 C and the terminal voltage was 0 V. Charge was again started, and this was repeated ten times.

The capacitance of the electrochemical device (the electric capacitance of the cell of the electrochemical device) was determined as follows. Namely, the discharge energy (overall discharge energy [W·s] as a time integral of discharge voltage×electric current) was obtained from a discharge curve (discharge voltage-discharge time), and the capacitance of the evaluated cell (capacitor capacitance) [F] was determined using a relation of capacitor capacitance [F]=2×overall discharge energy [W·s]/(discharge start voltage [V])². This capacitance (capacitor capacitance) [F] is an arithmetic mean of five measured values obtained from five measurement operations for the same evaluated cell.

Next, ESR of each electrochemical device was measured at the measurement ambient temperature of 25° C. and relative humidity of 60% (hereinafter referred to as "evaluation test 1"). The measurement of ESR was carried out according to the following procedure. Namely, ESR was calculated from a change amount of voltage under flow of electric current of 10 mA at the frequency of 1 kHz.

Then each of the electrochemical devices (electric double layer capacitors) of Example 1 to Example 6 and Comparative Example 1 to Comparative Example 5 was left to stand at 25° C. for 120 hours, and the capacitor capacitance [F] and ESR after left to stand for 120 hours were measured by the methods described above.

The results of capacitor capacitance and ESR of each electrochemical device (electric double layer capacitor) of Example 1 to Example 6 and Comparative Example 1 to Comparative Example 5 are presented in Table 1 below.

TABLE 1

|  | Before 120 hr rest | | After 120 hr rest | |
| --- | --- | --- | --- | --- |
|  | ESR [Ω] | Capacitance [F] | ESR [Ω] | Capacitance [F] |
| Example 1 | 5.2 | 0.054 | 5.3 | 0.054 |
| Example 2 | 5.3 | 0.054 | 5.3 | 0.054 |
| Example 3 | 5.5 | 0.054 | 5.4 | 0.054 |
| Example 4 | 6.3 | 0.054 | 6.9 | 0.054 |
| Example 5 | 5.6 | 0.054 | 5.6 | 0.054 |
| Example 6 | 5.3 | 0.054 | 5.3 | 0.054 |
| Comparative Example 1 | 11.0 | 0.054 | 16.8 | 0.054 |
| Comparative Example 2 | 11.3 | 0.054 | 17.5 | 0.054 |
| Comparative Example 3 | 210.0 | 0.048 | 211.0 | 0.048 |
| Comparative Example 4 | 27.5 | 0.050 | 27.2 | 0.050 |
| Comparative Example 5 | 10.7 | 0.054 | 16.3 | 0.054 |

As apparent from the results presented in Table 1, it was confirmed that each of the electrochemical devices of Example 1 to Example 6 achieved the capacitor capacitance superior to those of the comparative examples and ESR thereof was sufficiently reduced.

[Observation of Cross Section By SEM Photography]

Figure 18:
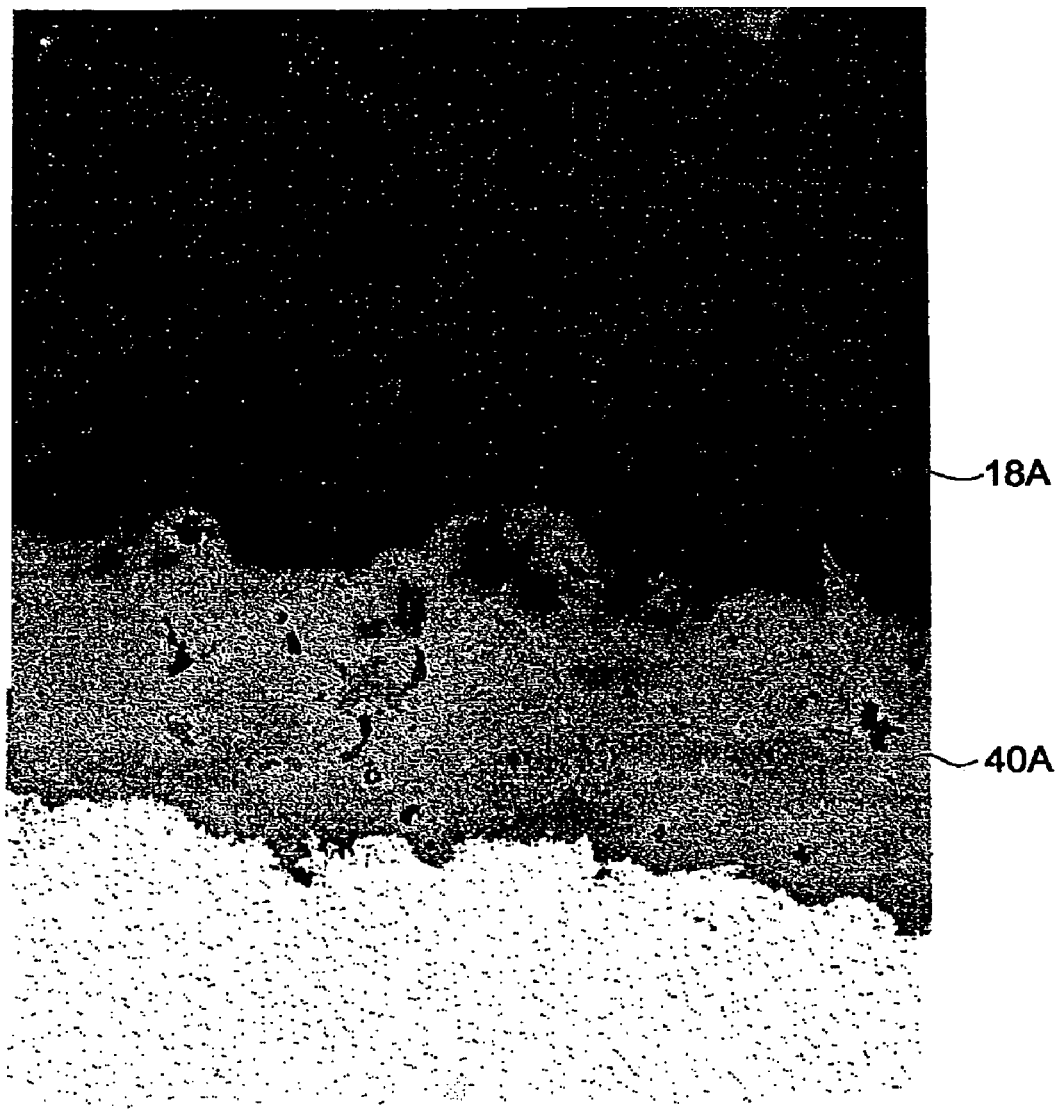
FIG. 18 is an illustration showing an SEM photograph of a partial cross section of an electrochemical device base used in an electrochemical capacitor of Example 1.

An SEM photograph was taken of a partial cross section of the electrochemical device base used in the electrochemical capacitor of Example 1. The result is shown in FIG. 18. As apparent from observation of the state of the interface part between the porous material layer 18A of the polarizable electrode and the separator 40A in the SEM photograph shown in FIG. 18, it was confirmed that the porous material layer 18A of the polarizable electrode to soften by the thermal treatment in the thermal treatment step was adequately adhered to the separator 40A not to soften by the thermal treatment in the thermal treatment step. Namely, it was confirmed that the porous material layer 18A of the polarizable electrode softened by the thermal treatment in the thermal treatment step and was deformed in accordance with the shape of uneven part in the surface of the separator 40A to be adhered to the uneven part.

The present invention provides the production method of the electrochemical device capable of readily and securely forming the electrochemical device capable of achieving satisfactory charge/discharge characteristics even in the case where the electrodes and separator are integrated in close contact by the thermal treatment. In addition, the present invention readily and securely provides the electrochemical device capable of achieving satisfactory charge/discharge characteristics, while adequately reducing the internal resistance.

The electrochemical capacitor obtained according to the present invention can be utilized as a backup power supply for a power supply of portable equipment (compact electronic devices) or the like, or as an auxiliary power supply for hybrid cars.

The invention claimed is:

1. A method of producing an electrochemical device which comprises a laminate having a first electrode and a second electrode facing each other, and a porous separator adjacently placed between the first electrode and the second electrode, and in which the first electrode and the second electrode are electrodes each having a collector, and a porous material layer with electron conductivity placed between the collector and the separator, the method comprising making the porous material layer, using as constituent materials, at least particles of a porous material with electron conductivity, and a thermoplastic resin being capable of binding the particles of the porous material together and having a softening point $T_B$ lower than a softening point $T_S$ of the separator, the method comprising a thermal treatment step of thermally treating the laminate at a thermal treatment temperature T1 satisfying a condition represented by Formula (1) below, thereby bringing the collector of the first electrode, the porous material layer of the first electrode, the separator, the porous material layer of the second electrode, and the collector of the second electrode in the laminate into an integrated state.

$$T_B \leq T1 < T_S \qquad (1).$$

2. The method according to claim 1, wherein electrodes of platelike shape are used as the first electrode and the second electrode, and wherein a member of platelike shape is used as the separator.

3. The method according to claim 2, wherein the thermal treatment step comprises placing the laminate between a pair of heating members facing each other and heating at least one of the pair of heating members.

4. The method according to claim 2, wherein the thermal treatment step comprises heating at least one of a pair of heating members in a state in which the laminate is pressed by the pair of heating members.

5. An electrochemical device obtained by the production method as set forth in claim 2.

6. The method according to claim 1, wherein the thermal treatment step comprises placing the laminate between a pair of heating members facing each other and heating at least one of the pair of heating members.

7. The method according to claim 6, wherein the thermal treatment step comprises heating at least one of a pair of heating members in a state in which the laminate is pressed by the pair of heating members.

8. An electrochemical device obtained by the production method as set forth in claim 6.

9. The method according to claim 1, wherein the thermal treatment step comprises heating at least one of a pair of heating members in a state in which the laminate is pressed by the pair of heating members.

10. An electrochemical device obtained by the production method as set forth in claim 9.

11. An electrochemical device obtained by the production method as set forth in claim 1.

* * * * *